US010333134B2

(12) United States Patent
Mikhaylik et al.

(10) Patent No.: US 10,333,134 B2
(45) Date of Patent: Jun. 25, 2019

(54) PROTECTED ELECTRODE STRUCTURES AND METHODS

(71) Applicant: Sion Power Corporation, Tucson, AZ (US)

(72) Inventors: Yuriy V. Mikhaylik, Tucson, AZ (US); Michael G. Laramie, Tucson, AZ (US); John Joseph Christopher Kopera, Vail, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 15/635,443

(22) Filed: Jun. 28, 2017

(65) Prior Publication Data

US 2017/0352863 A1 Dec. 7, 2017

Related U.S. Application Data

(62) Division of application No. 14/209,274, filed on Mar. 13, 2014, now Pat. No. 9,728,768.
(Continued)

(51) Int. Cl.
*H01M 4/64* (2006.01)
*H01M 4/04* (2006.01)
(Continued)

(52) U.S. Cl.
CPC ......... *H01M 4/0402* (2013.01); *H01M 2/168* (2013.01); *H01M 4/13* (2013.01);
(Continued)

(58) Field of Classification Search
CPC ...... H01M 4/0402; H01M 4/13; H01M 4/139; H01M 4/0407; H01M 4/0423;
(Continued)

(56) References Cited

U.S. PATENT DOCUMENTS 2,155,687 A 4/1939 Lee
3,080,350 A 3/1963 Kiyokazu et al.
(Continued)

FOREIGN PATENT DOCUMENTS

CN 1577919 A 2/2005
CN 1714465 A 12/2005
(Continued)

OTHER PUBLICATIONS

Extended European Search Report for EP 14769768.4 dated Sep. 23, 2016.
(Continued)

*Primary Examiner* — Raymond Alejandro
(74) *Attorney, Agent, or Firm* — Wolf, Greenfield & Sacks, P.C.

(57) ABSTRACT

An electrode structure and its method of manufacture are disclosed. The disclosed electrode structures may be manufactured by depositing a first release layer on a first carrier substrate. A first protective layer may be deposited on a surface of the first release layer and a first electroactive material layer may then be deposited on the first protective layer. The first protective layer may have a low mean peak to valley surface roughness and/or may be thin. In some embodiments, an interface between the first protective layer and the first electroactive material layer has a low mean peak to valley surface roughness.

15 Claims, 8 Drawing Sheets

Related U.S. Application Data

(60) Provisional application No. 61/787,897, filed on Mar. 15, 2013.

(51) Int. Cl.
| | | |
|---|---|---|
| *H01M 4/13* | (2010.01) | |
| *H01M 4/139* | (2010.01) | |
| *H01M 10/052* | (2010.01) | |
| *H01M 10/0565* | (2010.01) | |
| *H01M 10/058* | (2010.01) | |
| *H01M 2/16* | (2006.01) | |
| *H01M 4/1391* | (2010.01) | |
| *H01M 4/131* | (2010.01) | |

(52) U.S. Cl.
CPC ......... *H01M 4/139* (2013.01); *H01M 10/052* (2013.01); *H01M 10/058* (2013.01); *H01M 10/0565* (2013.01); *H01M 4/0407* (2013.01); *H01M 4/0423* (2013.01); *H01M 4/0428* (2013.01); *H01M 4/131* (2013.01); *H01M 4/1391* (2013.01); *H01M 2300/0085* (2013.01)

(58) Field of Classification Search
CPC .. H01M 4/0428; H01M 4/131; H01M 4/1391; H01M 2/168; H01M 10/058; H01M 10/0565; H01M 10/052; H01M 2300/0085

See application file for complete search history.

(56) References Cited

U.S. PATENT DOCUMENTS

| | | |
|---|---|---|
| 3,277,117 A | 10/1966 | Bolton et al. |
| 4,440,830 A | 4/1984 | Wempe |
| 4,664,991 A | 5/1987 | Perichaud et al. |
| 4,739,018 A | 4/1988 | Armand et al. |
| 4,833,048 A | 5/1989 | DeJonghe et al. |
| 4,917,974 A | 4/1990 | DeJonghe et al. |
| 4,954,371 A | 9/1990 | Yializis |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,681,615 A | 10/1997 | Affinito et al. |
| 5,682,210 A | 10/1997 | Weirich |
| 5,690,702 A | 11/1997 | Skotheim et al. |
| 5,723,230 A | 3/1998 | Naoi et al. |
| 5,783,330 A | 7/1998 | Naoi et al. |
| 5,786,092 A | 7/1998 | Lorenzo et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,010,798 A | 1/2000 | Hammerschmidt et al. |
| 6,020,412 A | 2/2000 | Muschelewicz |
| 6,025,094 A | 2/2000 | Visco et al. |
| 6,117,590 A | 9/2000 | Skotheim et al. |
| 6,120,930 A | 9/2000 | Rouillard et al. |
| 6,134,773 A | 10/2000 | Kejha |
| 6,136,468 A | 10/2000 | Mitchell, Jr. et al. |
| 6,153,337 A | 11/2000 | Carlson et al. |
| 6,201,100 B1 | 3/2001 | Gorkovenko et al. |
| 6,214,061 B1 | 4/2001 | Visco et al. |
| 6,248,469 B1 | 6/2001 | Formato et al. |
| 6,306,545 B1 | 10/2001 | Carlson et al. |
| 6,402,795 B1 | 6/2002 | Chu et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,488,721 B1 | 12/2002 | Carlson |
| 6,544,688 B1 | 4/2003 | Cheng |
| 6,737,197 B2 | 5/2004 | Chu et al. |
| 6,962,666 B2 | 11/2005 | Ravet et al. |
| 6,991,662 B2 | 1/2006 | Visco et al. |
| 7,070,632 B1 | 7/2006 | Visco et al. |
| 7,081,142 B1 | 7/2006 | Carlson |
| 7,160,603 B2 | 1/2007 | Carlson |
| 7,175,937 B2 | 2/2007 | Cho et al. |
| 7,247,408 B2 | 7/2007 | Skotheim et al. |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,087,309 B2 | 1/2012 | Kelley et al. |
| 8,105,717 B2 | 1/2012 | Skotheim et al. |
| 8,114,171 B2 | 2/2012 | Visco et al. |
| 8,139,343 B2 | 3/2012 | Gibson et al. |
| 8,182,943 B2 | 5/2012 | Visco et al. |
| 8,197,971 B2 | 6/2012 | Skotheim et al. |
| 8,202,649 B2 | 6/2012 | Visco et al. |
| 8,329,343 B2 | 12/2012 | Yamaguchi et al. |
| 8,334,075 B2 | 12/2012 | Visco et al. |
| 8,338,034 B2 | 12/2012 | Affinito et al. |
| 8,415,054 B2 | 4/2013 | Skotheim et al. |
| 8,436,125 B2 | 5/2013 | Cristadoro et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont Sempere et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,397,342 B2 | 7/2016 | Skotheim et al. |
| 9,548,492 B2 | 1/2017 | Affinito et al. |
| 9,653,735 B2 | 5/2017 | Skotheim et al. |
| 9,653,750 B2 | 5/2017 | Laramie et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 2001/0014420 A1 | 8/2001 | Takeuchi et al. |
| 2001/0036573 A1 | 11/2001 | Jen et al. |
| 2002/0012846 A1 | 1/2002 | Skotheim et al. |
| 2002/0015885 A1 | 2/2002 | Hara et al. |
| 2002/0144899 A1 | 10/2002 | Arcella et al. |
| 2004/0126653 A1 | 7/2004 | Visco et al. |
| 2004/0146786 A1 | 7/2004 | Sato et al. |
| 2004/0185335 A1 | 9/2004 | Carlson |
| 2004/0209159 A1 | 10/2004 | Lee et al. |
| 2004/0253510 A1 | 12/2004 | Jonghe et al. |
| 2005/0008938 A1 | 1/2005 | Cho et al. |
| 2005/0095504 A1 | 5/2005 | Kim et al. |
| 2006/0051677 A1 | 3/2006 | Matsushima et al. |
| 2006/0115579 A1 | 6/2006 | Mukherjee et al. |
| 2006/0121345 A1 | 6/2006 | Yasuda et al. |
| 2006/0130320 A1 | 6/2006 | Murosawa et al. |
| 2006/0147801 A1 | 7/2006 | Yasuda et al. |
| 2006/0147802 A1 | 7/2006 | Yasuda et al. |
| 2006/0180269 A1 | 8/2006 | Karatsu et al. |
| 2006/0222954 A1 | 10/2006 | Skotheim et al. |
| 2006/0238203 A1 | 10/2006 | Kelley et al. |
| 2007/0072036 A1 | 3/2007 | Berta et al. |
| 2007/0106057 A1 | 5/2007 | Watanabe et al. |
| 2007/0166617 A1 | 7/2007 | Gozdz et al. |
| 2007/0221265 A1 | 9/2007 | Affinito et al. |
| 2007/0224502 A1 | 9/2007 | Affinito et al. |
| 2008/0014501 A1 | 1/2008 | Skotheim et al. |
| 2008/0020923 A1 | 1/2008 | Debe et al. |
| 2008/0057397 A1 | 3/2008 | Skotheim et al. |
| 2008/0187663 A1 | 8/2008 | Affinito |
| 2008/0190841 A1 | 8/2008 | Pascaly et al. |
| 2008/0213672 A1 | 9/2008 | Skotheim et al. |
| 2008/0318128 A1 | 12/2008 | Simoneau et al. |
| 2009/0029250 A1 | 1/2009 | Stebani et al. |
| 2009/0061288 A1 | 3/2009 | Gordon et al. |

(56) References Cited

U.S. PATENT DOCUMENTS

| | | |
|---|---|---|
| 2009/0197158 A1 | 8/2009 | Ogawa et al. |
| 2009/0200986 A1 | 8/2009 | Kopera |
| 2009/0226809 A1 | 9/2009 | Vu et al. |
| 2009/0291353 A1 | 11/2009 | Affinito et al. |
| 2010/0035128 A1 | 2/2010 | Scordilis-Kelley et al. |
| 2010/0129699 A1 | 5/2010 | Mikhaylik et al. |
| 2010/0233547 A1 | 9/2010 | Baba et al. |
| 2010/0239914 A1 | 9/2010 | Mikhaylik et al. |
| 2010/0291442 A1 | 11/2010 | Wang et al. |
| 2010/0327811 A1 | 12/2010 | Affinito et al. |
| 2011/0059361 A1 | 3/2011 | Wilkening et al. |
| 2011/0068001 A1* | 3/2011 | Affinito ............... H01M 4/13 204/242 |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0177398 A1* | 7/2011 | Affinito ............. H01M 4/134 429/325 |
| 2011/0206992 A1 | 8/2011 | Campbell et al. |
| 2011/0244336 A1 | 10/2011 | Schmitz et al. |
| 2011/0311856 A1 | 12/2011 | Matusi et al. |
| 2012/0043940 A1 | 2/2012 | Affinito et al. |
| 2012/0048729 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0214043 A1 | 8/2012 | Olschimke et al. |
| 2012/0219842 A1 | 8/2012 | Visco et al. |
| 2012/0270112 A1 | 10/2012 | Visco et al. |
| 2012/0276449 A1 | 11/2012 | Skotheim et al. |
| 2012/0301774 A1 | 11/2012 | Jiang et al. |
| 2013/0004852 A1 | 1/2013 | Visco et al. |
| 2013/0017441 A1 | 1/2013 | Affinito et al. |
| 2013/0059192 A1 | 3/2013 | Kajita et al. |
| 2013/0095380 A1 | 4/2013 | Affinito et al. |
| 2013/0118980 A1 | 5/2013 | Mueller-Cristadoro et al. |
| 2013/0143096 A1 | 6/2013 | Affinito et al. |
| 2013/0149587 A1 | 6/2013 | Yu et al. |
| 2013/0216915 A1 | 8/2013 | Affinito et al. |
| 2013/0224601 A1 | 8/2013 | Burnside et al. |
| 2013/0252103 A1 | 9/2013 | Mikhaylik et al. |
| 2013/0266842 A1 | 10/2013 | Woehrle et al. |
| 2013/0280605 A1 | 10/2013 | Affinito et al. |
| 2014/0045070 A1 | 2/2014 | Mueller-Cristadoro et al. |
| 2014/0045075 A1 | 2/2014 | Skotheim et al. |
| 2014/0062411 A1 | 3/2014 | Mikhaylik et al. |
| 2014/0072873 A1 | 3/2014 | Wang et al. |
| 2014/0079994 A1 | 3/2014 | Affinito et al. |
| 2014/0123477 A1 | 5/2014 | Safont Sempere et al. |
| 2014/0127419 A1 | 5/2014 | Fleischmann et al. |
| 2014/0127577 A1 | 5/2014 | Fleischmann et al. |
| 2014/0193723 A1 | 7/2014 | Kumaresan et al. |
| 2014/0205912 A1 | 7/2014 | Skotheim et al. |
| 2014/0272565 A1 | 9/2014 | Gronwald et al. |
| 2014/0272594 A1 | 9/2014 | Safont Sempere et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2017/0141402 A1 | 5/2017 | Affinito et al. |
| 2017/0250390 A1 | 8/2017 | Laramie et al. |
| 2017/0373321 A1 | 12/2017 | Skotheim et al. |

FOREIGN PATENT DOCUMENTS

| | | |
|---|---|---|
| CN | 1728418 A | 2/2006 |
| CN | 1883066 A | 12/2006 |
| CN | 101479868 A | 7/2009 |
| DE | 199 16 043 A1 | 10/2000 |
| EP | 1 296 391 A1 | 3/2003 |
| EP | 1693910 A | 8/2006 |
| JP | H07-017197 A | 1/1995 |
| JP | H08-267943 A | 10/1996 |
| JP | H11-114481 A2 | 4/1999 |
| JP | H11-256113 A2 | 9/1999 |
| JP | 2000-040506 A2 | 2/2000 |
| JP | 2001-085065 A | 3/2001 |
| JP | 2002-363898 A2 | 12/2002 |
| JP | 2005-044796 A2 | 2/2005 |
| JP | 2005-063978 A2 | 3/2005 |
| JP | 2005-096200 A2 | 4/2005 |
| JP | 2005-199190 A2 | 7/2005 |
| JP | 2006-108066 A2 | 4/2006 |
| JP | 2006-155900 A2 | 6/2006 |
| JP | 2006-216565 A2 | 8/2006 |
| JP | 2006-236685 A2 | 9/2006 |
| JP | 2008-520804 T2 | 6/2008 |
| KR | 10-2005-0007484 A | 1/2005 |
| KR | 10-2006-0109435 A | 10/2006 |
| WO | WO 99/033125 A1 | 7/1999 |
| WO | WO 99/033130 A1 | 7/1999 |
| WO | WO 2001/039303 A1 | 5/2001 |
| WO | WO 03/99556 A1 | 12/2003 |
| WO | WO 2006/027886 A1 | 3/2006 |
| WO | WO 2006/055233 A1 | 5/2006 |
| WO | WO 2007/124011 A2 | 11/2007 |
| WO | WO 2008/070059 A2 | 6/2008 |
| WO | WO 2009/017726 A1 | 2/2009 |
| WO | WO 2009/029270 A1 | 3/2009 |
| WO | WO 2009/042071 A2 | 4/2009 |
| WO | WO 2009/054987 A1 | 4/2009 |
| WO | WO 2009/089018 A2 | 7/2009 |
| WO | WO 2011/023110 A1 | 3/2011 |
| WO | WO 2011/028251 A2 | 3/2011 |
| WO | WO 2011/147723 A1 | 12/2011 |
| WO | WO 2012/025543 A1 | 3/2012 |
| WO | WO 2012/156903 A1 | 11/2012 |
| WO | WO 2013/072224 A1 | 5/2013 |
| WO | WO 2014/032948 A1 | 3/2014 |

OTHER PUBLICATIONS

International Search Report and Written Opinion for PCT/US2014/025618 dated Jun. 27, 2014.
International Preliminary Report on Patentability for PCT/US2014/025618 dated Sep. 24, 2015.
[No Author Listed] Chemical Properties of Ethyl Vinyl Ether. 2008. Accessed on Apr. 11, 2014 at http://www.chemicalbook.com/ProductChemicalPropertiesCB0708241_EN.htm.
[No Author Listed] SYL-OFF Formulation Guide. 2007.
Addae-Mensan et al. J Micromech Microeng. 2007; 17:N41-N46.
Alamgir et al., Lithium Batteries, New Materials, Developments and Perspectives, Chapter 3. Elsevier, Amsterdam. 1994; 93-136.
Dominey, Lithium Batteries, New Materials, Developments and Perspectives, Chapter 4. Elsevier, Amsterdam. 1994; 137-165.
Kim et al., Surface-modified membrane as a separator for lithium-ion polymer battery. Energies. Apr. 23, 2010; 3:866-885.
Nakamatsu et al. Jap J Appl Phys. 2005; 44(11):8186-8188.
Saxena. Polyvinyl Alcohol Chemical and Technical Assessment. 2004.
U.S. Appl. No. 12/862,513, filed Aug. 24, 2010, Affinito et al.
U.S. Appl. No. 14/088,750, filed Nov. 25, 2013, Affinito et al.
U.S. Appl. No. 12/862,528, filed Aug. 24, 2010, Affinito et al.
U.S. Appl. No. 14/209,396, filed Mar. 13, 2014, Gronwald et al.
U.S. Appl. No. 14/184,037, filed Feb. 19, 2014, Laramie et al.
U.S. Appl. No. 15/459,152, filed Mar. 15, 2017, Laramie et al.
EP 14769768.4, dated Sep. 23, 2016, Extended European Search Report.

(56) References Cited

OTHER PUBLICATIONS

PCT/US2014/025618, dated Jun. 27, 2014, International Search Report and Written Opinion.
PCT/US2014/025618, dated Sep. 24, 2015, International Preliminary Report on Patentability.

* cited by examiner

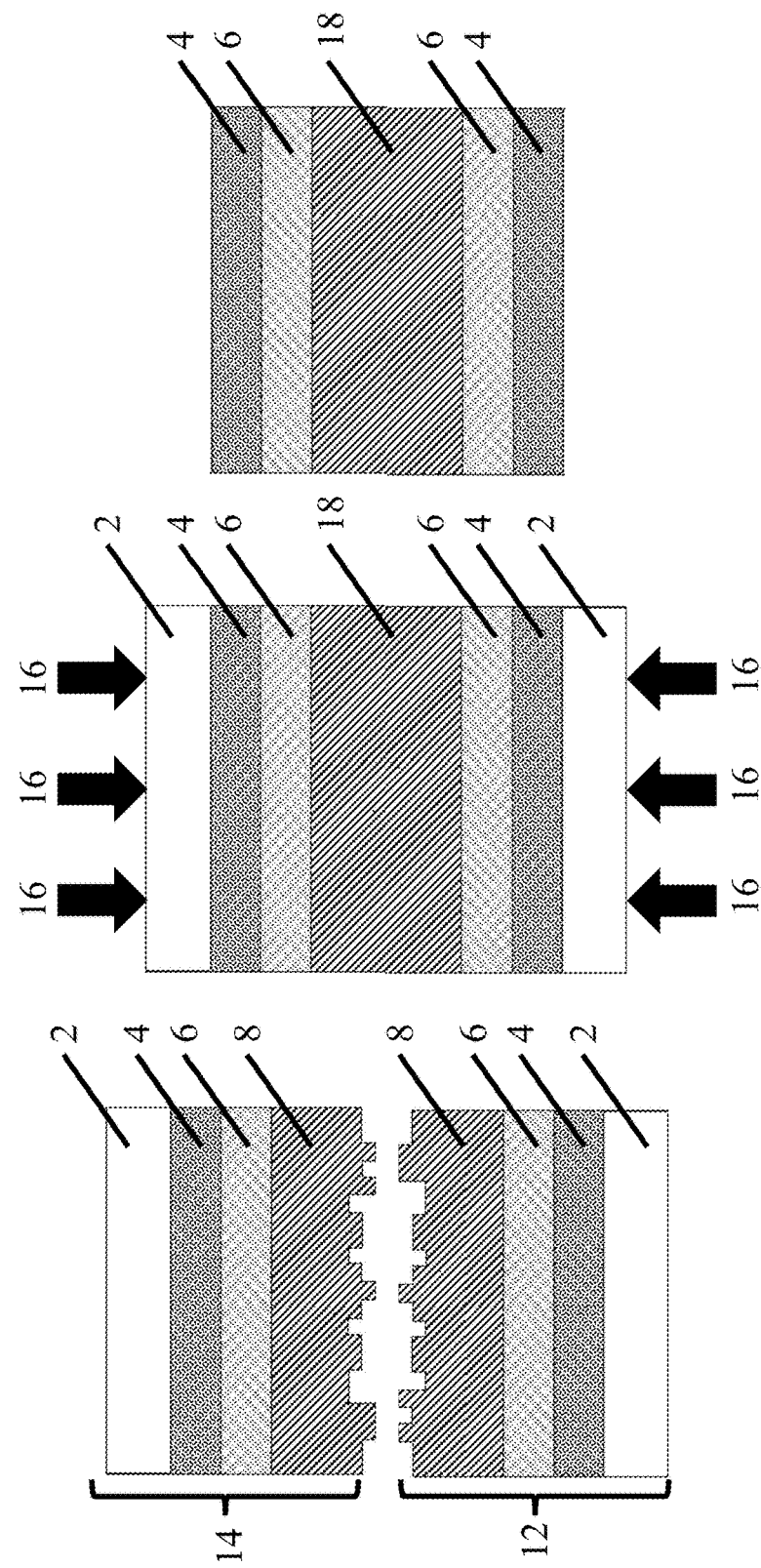

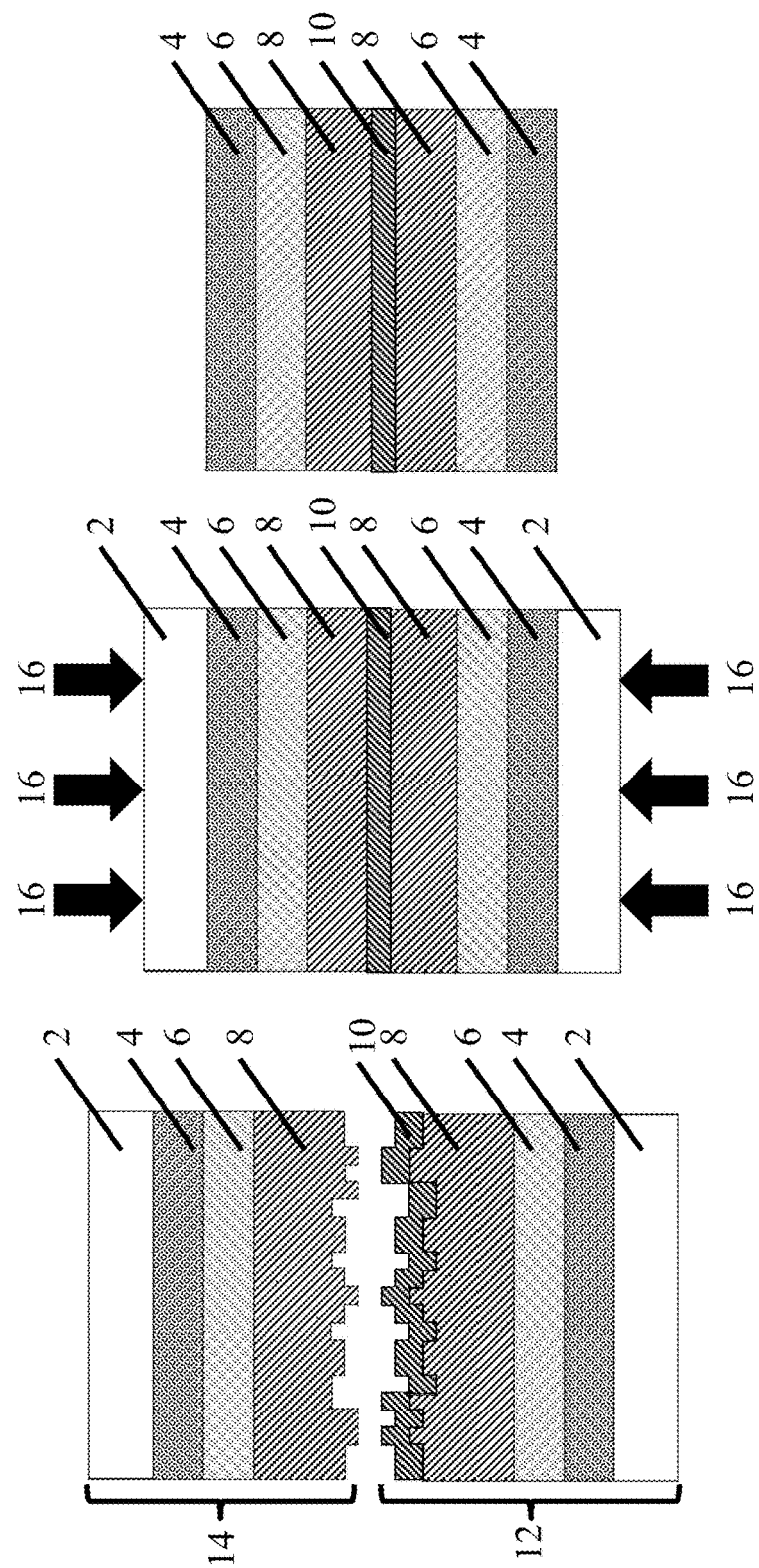

PROTECTED ELECTRODE STRUCTURES AND METHODS

RELATED APPLICATIONS

The present application is a divisional of U.S. application Ser. No. 14/209,274, filed Mar. 13, 2014, which claims priority under 35 U.S.C. § 119(e) to U.S. Provisional Patent Apl. No. 61/787,897, filed on Mar. 15, 2013, which are hereby incorporated by reference in their entirety for all purposes.

GOVERNMENT SPONSORSHIP

This invention was made with Government support under Grant No. DE-AR0000067, awarded by the Department of Energy ARPA-E program (ARPA-E BEEST DE-FOA-00000207-1536). The Government has certain rights in this invention.

FIELD OF THE INVENTION

Disclosed embodiments are related to protected electrode structures and their method of manufacture.

BACKGROUND

Rechargeable and primary electrochemical cells oftentimes include a protective layer(s) to protect the electroactive surface. Depending upon the specific protective layer(s), the protective layer(s) isolates the underlying electroactive surface from interactions with the electrolyte and/or other components within the electrochemical cell. In order to provide appropriate protection of the underlying electrode, it is desirable that the protective layer(s) continuously cover the underlying electrode and exhibit a minimal number of defects. Although techniques for forming protective layer(s) exist, methods that would allow formation of protective layer(s) that would improve the performance of an electrochemical cell would be beneficial.

SUMMARY

Protected electrode structures and their method of manufacture are provided. The subject matter of this application involves, in some cases, interrelated structures and methods, alternative solutions to a particular problem, and/or a plurality of different uses of structures.

In one embodiment, a method may include: providing a first carrier substrate; depositing a first release layer on the first carrier substrate, wherein a mean peak to valley roughness of a surface of the first release layer opposite the first carrier substrate is between about 0.1 µm and about 1 µm; depositing a first protective layer on the surface of the first release layer; and depositing a first electroactive material layer on the first protective layer.

In another embodiment, a method may include: providing a first carrier substrate, depositing a first release layer on the first carrier substrate, wherein a mean peak to valley roughness of a surface of the first release layer opposite the first carrier substrate is between about 0.1 µm and about 1 µm, and wherein the first release layer has a thickness of greater than or equal to about 2 µm; depositing a first protective layer on the surface of the first release layer; and depositing a first electroactive material layer on the first protective layer, wherein an adhesive strength between the first release layer and the first protective layer is greater than an adhesive strength between the first release layer and the first carrier substrate.

In another embodiment, a method may include: providing a first carrier substrate; depositing a first release layer on the first carrier substrate, wherein the first release layer comprises a polymer gel; depositing a first protective layer on the surface of the first release layer, wherein a thickness of the first release layer is greater than the mean peak to valley roughness of the substrate; and depositing a first electroactive material layer on the first protective layer.

In yet another embodiment, an electrode structure may include a first carrier substrate and a first release layer disposed on the first carrier substrate. A first protective layer may be disposed on the first release layer. A mean peak to valley roughness of an interface between the first release layer and the first protective layer may be between about 0.1 µm and about 1 µm. A first electroactive material layer may be disposed on the first protective layer.

In another embodiment, an electrode structure may include a first release layer and a substantially continuous protective layer disposed on the first release layer. A mean peak to valley roughness of the protective layer may be between about 0.1 µm and about 1 µm. Further, a thickness of the protective layer may be between about 0.1 µm and about 2 µm. A first electroactive material layer may be disposed on the protective layer.

In yet another embodiment, an electrode structure may include a first release layer and a first protective layer disposed on the first release layer. A first electroactive material layer may be disposed on the first protective layer. A mean peak to valley roughness of an interface between the first protective layer and the first electroactive material layer may be between about 0.1 µm and about 1 µm.

In yet another embodiment, an electrode structure may include a first carrier substrate and a first release layer disposed on the first carrier substrate. The first release layer may have a thickness of greater than or equal to about 2 µm. A first protective layer may be disposed on the first release layer. A mean peak to valley roughness of an interface between the first release layer and the first protective layer may be between about 0.1 µm and about 1 µm. A first electroactive material layer may be disposed on the first protective layer. An adhesive strength between the first release layer and the first protective layer is greater than an adhesive strength between the first release layer and the first carrier substrate.

It should be appreciated that the foregoing concepts, and additional concepts discussed below, may be arranged in any suitable combination, as the present disclosure is not limited in this respect.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a schematic representation of two portions of an electrode structure prior to lamination, according to one set of embodiments;

FIG. 4 is a schematic representation of two portions of an electrode structure during lamination, according to one set of embodiments;

FIG. 5 is a schematic representation of a combined electrode structure after lamination, according to one set of embodiments;

FIG. 6 is a schematic representation of two portions of an electrode structure including a current collector prior to lamination, according to one set of embodiments;

FIG. 7 is a schematic representation of two portions of an electrode structure including a current collector during lamination, according to one set of embodiments;

FIG. 8 is a schematic representation of a combined electrode structure including a current collector after lamination, according to one set of embodiments;

DETAILED DESCRIPTION

Figure 1A:
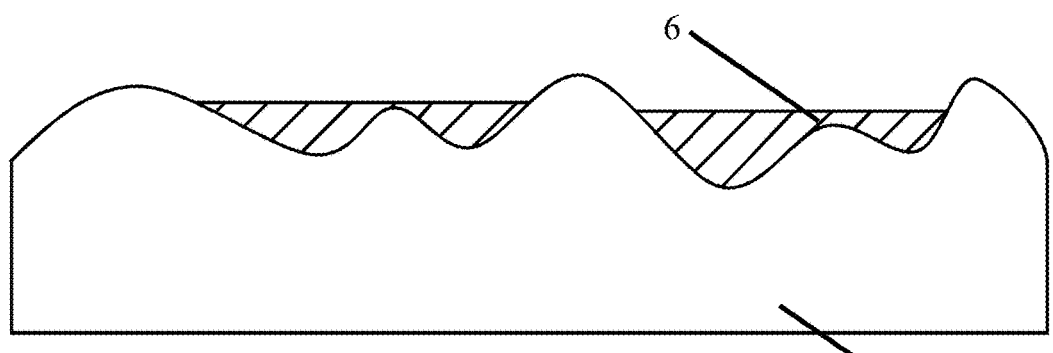
FIG. 1A is a schematic representation of a protective layer deposited on to an underlying electro active material layer, according to one set of embodiments.
Figure 1B:
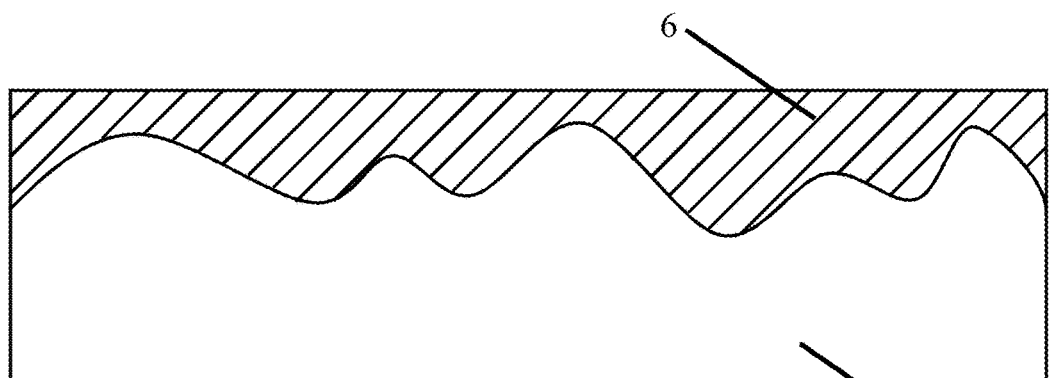
FIG. 1B is another schematic representation of a protective layer deposited on to an underlying electroactive material layer, according to one set of embodiments.

The inventors have recognized that it is desirable to reduce the thickness of one or more protective layers of an electrode structure to lower the cell internal resistance and increase the rate capability of the final electrochemical cell into which the electrode structure is incorporated. However, while it is desirable to reduce the thickness of the one or more protective layers, it is also desirable to maintain the integrity of the one or more protective layers. In order to provide a substantially continuous protective layer exhibiting sufficient integrity, the protective layer thickness is typically greater than the average roughness of the underlying substrate. This concept is shown illustratively in FIGS. 1A-1B. When a protective layer 6 is deposited directly onto an underlying substrate 1, and the thickness of the protective layer is less than the roughness of the underlying substrate, the protective layer is not substantially continuous as illustrated in FIG. 1A. In contrast, when the protective layer thickness is greater than about the roughness of the underlying substrate 1, a substantially continuous protective layer 6 is formed as shown in FIG. 1B.

In view of the above, in order to provide thinner protective layers, the inventors have recognized that it is desirable to reduce the surface roughness of the underlying substrate onto which the one or more protective layers are deposited. In a typical process for forming an electrode structure, a protective layer is typically deposited on top of an electroactive layer, and the thickness of the protective layer is influenced, at least in part, by the roughness of the electroactive material layer. However, it is generally difficult to obtain surface roughnesses below a particular threshold for an underlying electroactive material layer due to considerations such as the material layer thickness, method of production, and other appropriate considerations. For example, metallic lithium in the form of a foil or vacuum deposited layer typically exhibits a relatively rough surface characterized by peak to valley differences between about 1 µm to about 2 µm. As such, there is a limit as to how thin a substantially continuous protective layer can be made when deposited directly onto the electroactive material layer because there is a limit as to how smooth the surface of the underlying electroactive material layer can be made.

Due to the limitations regarding how smooth the surface of an electroactive material layer can be made, the inventors have recognized the benefit of depositing a protective layer onto a separate layer with a surface roughness lower than that of the electroactive material layer. When deposited onto this separate layer with a lower surface roughness, it is possible to obtain a substantially continuous protective layer that is thinner than may be obtained when deposited directly onto the electroactive material layer. In one set of embodiments, and as described in more detail below, the separate layer is a release layer positioned on a carrier substrate. Depending upon the embodiment, after formation of the protective layer, a corresponding layer of electroactive material may be bonded with, or deposited onto, the protective layer to provide a desired electrode structure. As described in more detail below, additional layers (e.g., additional protective layers) may also be present between the protective layer and electroactive material layer.

For the sake of clarity, the structures described herein are referred to as electrode structures. However, an electrode structure may refer to either an electrode precursor, or a final electrode. An electrode precursor may include, for example, an electrode including one or more components such as a carrier substrate that will not be present in a final electrode or final electrochemical cell, or an electrode that is absent one or more components prior to being used as a final electrode or in a final electrochemical cell. It should be understood, therefore, that the embodiments described herein should not be limited to either an electrode precursor or a final electrode. Instead, the embodiments described herein are meant to apply to any of an electrode precursor, an unassembled final electrode, and a final electrode assembled into an electrochemical cell or any other appropriate device.

Furthermore, while the electrode structures described herein are described in reference to a lithium metal based system, it should be understood that the methods and articles described herein may be applicable to any suitable electrochemical system (including other alkali metal systems, e.g., alkali metal anodes including lithium-ion anodes, or even non-alkali metal systems). Additionally, although rechargeable electrochemical cells are intended to benefit from the current disclosure, non-rechargeable (i.e., primary) electrochemical cells can also benefit from the current disclosure.

Turning now to the figures, the various embodiments of the current disclosure are described in more detail.

Figure 2A:
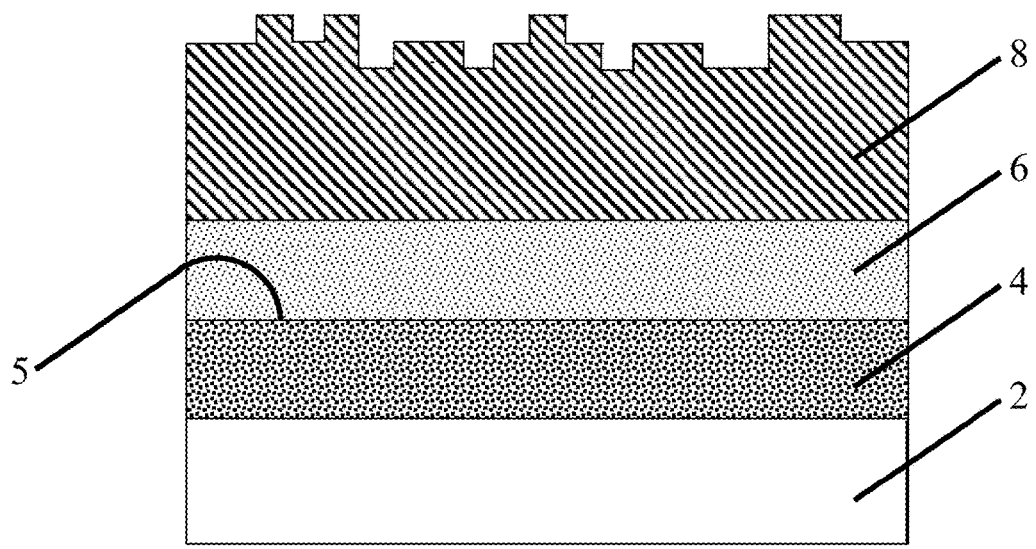
FIG. 2A is a schematic representation of an electrode structure deposited onto a release layer and carrier substrate, according to one set of embodiments.
Figure 2B:
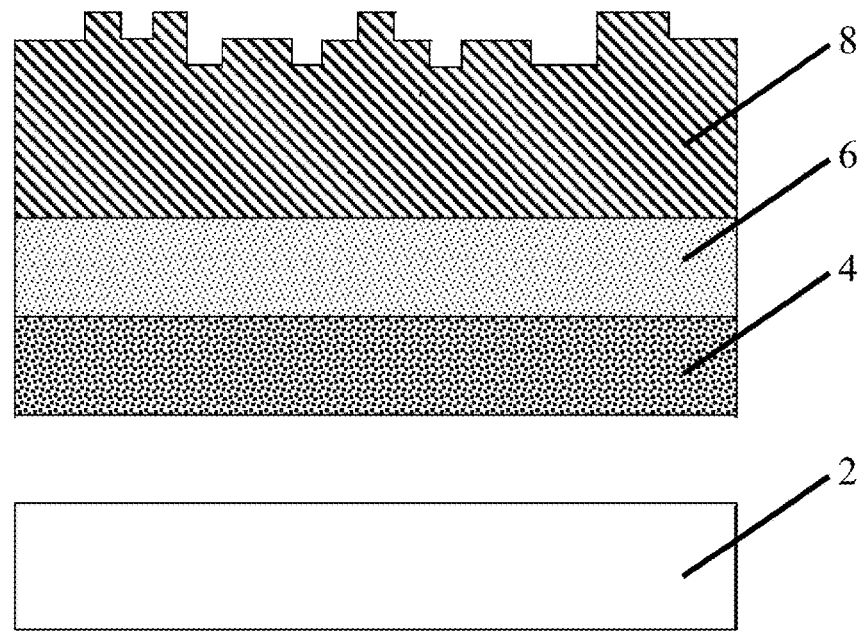
FIG. 2B is a schematic representation of the electrode structure of FIG. 2A with the carrier substrate delaminated, according to one set of embodiments.
Figure 2C:
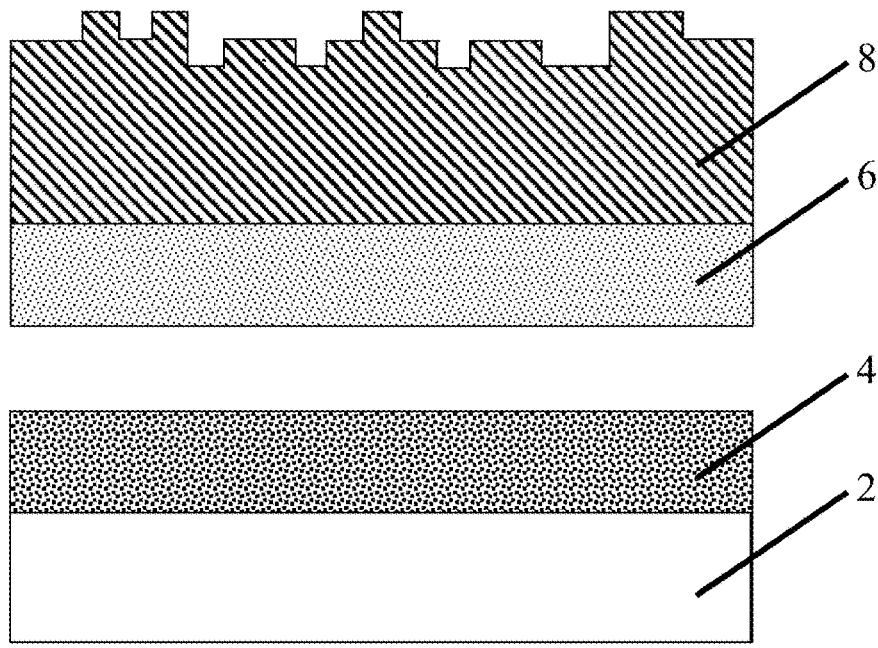
FIG. 2C is a schematic representation of the electrode structure of FIG. 2A with the carrier substrate and release layer delaminated, according to one set of embodiments.

FIG. 2A depicts one embodiment of an electrode structure including a carrier substrate 2. As shown illustratively in FIG. 2A, a release layer 4 is disposed on carrier substrate 2, a protective layer 6 is disposed on release layer 4, and an electroactive material layer 8 is disposed on protective layer 6. A surface 5 of release layer 4 is located on a side of the release layer opposite carrier substrate 2. Surface 5 also corresponds to the interface between release layer 4 and protective layer 6 upon which protective layer 6 is deposited. While the layers depicted in the figure are disposed directly on one another, it should be understood that other intermediate layers may also be present between the depicted layers in certain embodiments. Accordingly, as used herein, when a layer is referred to as being "disposed on", "deposited on", or "on" another layer, it can either be directly disposed on, deposited onto, or on the layer, or an intervening layer may also be present. In contrast, a layer that is "directly disposed on", "in contact with", "directly deposited on", or "directly on" another layer indicates that no intervening layer is present.

In the depicted embodiment, carrier substrate 2 may be any appropriate material capable of supporting the electrode structure during deposition and lamination. In embodiments in which the protective layer is not deposited directly onto the carrier substrate, the surface roughness of the carrier substrate may not directly impact the surface roughness of the interface between the release layer 4 and protective layer 6. However, in at least one embodiment, it is desirable for the carrier substrate 2 to exhibit a relatively smooth surface upon which to deposit release layer 4 to enable the deposition of a relatively thin release layer 4 for providing a smooth surface upon which to subsequently deposit protective layer 6.

In the depicted embodiment shown in FIG. 2, release layer 4 may serve a dual purpose within the electrode structure. Release layer 4 may form a surface exhibiting a relatively low roughness upon which to deposit protective layer 6. In addition, release layer 4 also may have a relatively high adhesive strength to one of carrier substrate 2 and protective layer 4 and a relatively moderate or poor adhesive strength to the other of carrier substrate 2 and protective layer 4. Consequently, the release layer can function to facilitate the delamination of carrier substrate 2 from the final electrode structure when a peel force is applied to either carrier substrate 2 (and/or to the electrode structure).

Depending on which component the release layer shows a relatively high adhesive strength to, release layer 2 may, or may not be, incorporated within the final electrode structure. Whether or not the release layer is incorporated into the final electrode structure can be varied by tailoring the chemical and/or physical properties of the release layer. For example, if it is desirable for release layer 4 to be part of the final electrode structure, the release layer may be tailored to have a greater adhesive strength to protective layer 6 relative to its adhesive strength to carrier substrate 2. Consequently, when a delamination force is applied to the carrier substrate (and/or to the electrode structure), carrier substrate 2 is delaminated from the electrode structure and release layer 4 is retained with the electrode structure (see FIG. 2B).

In embodiments in which the release layer is incorporated into a final electrochemical cell, the release layer may be formed of a material that is stable in the electrolyte and does not substantially interfere with the structural integrity of the electrode. In certain embodiments in which the release layer is incorporated into the final electrode structure or electrochemical cell, the release layer may serve as an electrolyte (e.g., a polymer gel electrolyte) to facilitate the conduction of ions, or it may function as a separator. Other uses of the release layer are also possible. In certain particular embodiments, the release layer is formed of a polymer gel that is conductive to lithium ions and/or contains lithium ions.

On the other hand, if it is desirable for the release layer to not be part of a final electrode structure, the release layer may be designed to have a greater adhesive strength to carrier substrate 2 relative to its adhesive strength to protective layer 6. In such an embodiment, when a delamination force is applied to the carrier substrate, carrier substrate 2 and release layer 4 are delaminated from the electrode structure (see FIG. 2C).

The release layer may be formed using any appropriate material exhibiting the desired surface roughness and release properties relative to the carrier substrate and protective layer. The specific material to be used will depend, at least in part, on factors such as the particular type of carrier substrate used, the material in contact with the other side of the release layer, whether the release layer is to be incorporated into the final electrode structure, and whether the release layer has an additional function after being incorporated into the electrochemical cell.

In one set of embodiments, the release layer is formed of a polymeric material. Specific examples of appropriate polymers include, but are not limited to, polyoxides, poly(alkyl oxides)/polyalkylene oxides (e.g., polyethylene oxide, polysulfones polypropylene oxide, polybutylene oxide), polyethersulfones, polyphenylsulfones, polyvinyl alcohols, polyvinyl butyral, polyvinyl formal, vinyl acetate-vinyl alcohol copolymers, ethylene-vinyl alcohol copolymers, and vinyl alcohol-methyl methacrylate copolymers, polysiloxanes, and fluorinated polymers. The polymer may be in the form of, for example, a solid polymer (e.g., a solid polymer electrolyte), a glassy-state polymer, or a polymer gel.

In some embodiments, the release layer includes a polymer that is conductive to certain ions (e.g., alkali metal ions) but is also substantially electrically conductive. Examples of such materials include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(paraphenylene vinylene)s. Electrically-conductive additives may also be added to polymers to form electrically-conductive polymers.

In some embodiments, a release layer includes a polymer that is conductive to one or more types of ions. In some cases, the release layer may be substantially non-electrically conductive. Examples of ion-conductive species (that may be substantially non-electrically conductive) include non-electrically conductive materials (e.g., electrically insulating materials) that are doped with lithium salts. E.g., acrylate, polyethyleneoxide, silicones, polyvinylchlorides, and other insulating polymers that are doped with lithium salts can be ion-conductive (but substantially non-electrically conductive). Additional examples of polymers include ionically conductive polymers, sulfonated polymers, and hydrocarbon polymers. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

In some embodiments, a release layer includes a crosslinkable polymer. Non-limiting examples of crosslinkable polymers include: polyvinyl alcohol, polyvinylbutryl, polyvinylpyridyl, polyvinyl pyrrolidone, polyvinyl acetate, acrylonitrile butadiene styrene (ABS), ethylene-propylene rubbers (EPDM), EPR, chlorinated polyethylene (CPE), ethelynebisacrylamide (EBA), acrylates (e.g., alkyl acrylates, glycol acrylates, polyglycol acrylates, ethylene ethyl acrylate (EEA)), hydrogenated nitrile butadiene rubber (HNBR), natural rubber, nitrile butadiene rubber (NBR), certain fluoropolymers, silicone rubber, polyisoprene, ethylene vinyl acetate (EVA), chlorosulfonyl rubber, flourinated poly(arylene ether) (FPAE), polyether ketones, polysulfones, polyether imides, diepoxides, diisocyanates, diisothiocyanates, formaldehyde resins, amino resins, polyurethanes, unsaturated polyethers, polyglycol vinyl ethers, polyglycol divinyl ethers, copolymers thereof, and those described in U.S. Pat. No. 6,183.901 to Ying et al. of the common assignee for protective coating layers for separator layers.

Those of ordinary skill in the art can choose appropriate polymers that can be crosslinked, as well as suitable methods of crosslinking, based upon general knowledge of the art in combination with the description herein. The crosslinked polymer materials may further comprise salts, for example, lithium salts, to enhance ionic conductivity.

If a crosslinkable polymer is used, the polymer (or polymer precursor) may include one or more crosslinking agents. A crosslinking agent is a molecule with a reactive portion(s) designed to interact with functional groups on the polymer chains in a manner that will form a crosslinking bond between one or more polymer chains. Examples of crosslinking agents that can crosslink polymeric materials used for release layers described herein include, but are not limited to: polyamide-epichlorohydrin (polycup 172); aldehydes (e.g., formaldehyde and urea-formaldehyde); dialdehydes (e.g., glyoxal glutaraldehyde, and hydroxyadipaldehyde); acrylates (e.g., ethylene glycol diacrylate, di(ethylene glycol) diacrylate, tetra(ethylene glycol) diacrylate, methacrylates, ethelyne glycol dimethacrylate, di(ethylene glycol) dimethacrylate, tri(ethylene glycol) dimethacrylate); amides (e.g., N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide); silanes (e.g., methyltrimethoxysilane, methyltriethoxysilane, tetramethoxysilane (TMOS), tetraethoxysilane (TEOS), tetrapropoxysilane, methyltris(methylethyldetoxime)silane, methyltris(acetoxime)silane, methyltris(methylisobutylketoxime)silane, dimethyldi(methylethyldetoxime)silane, trimethyl(methylethylketoxime)silane, vinyltris(methylethylketoxime)silane, methylvinyldi(mtheylethylketoxime)silane, methylvinyldi(cyclohexaneoneoxxime)silane, vinyltris (mtehylisobutylketoxime)silane, methyltriacetoxysilane, tetraacetoxysilane, and phenyltris(methylethylketoxime)silane); divinylbenzene; melamine; zirconium ammonium carbonate; dicyclohexylcarbodiimide/dimethylaminopyridine (DCC/DMAP); 2-chloropyridinium ion; 1-hydroxycyclohexylphenyl ketone; acetophenon dimethylketal; benzoylmethyl ether; aryl triflourovinyl ethers; benzocyclobutenes; phenolic resins (e.g., condensates of phenol with formaldehyde and lower alcohols, such as methanol, ethanol, butanol, and isobutanol), epoxides; melamine resins (e.g., condensates of melamine with formaldehyde and lower alcohols, such as methanol, ethanol, butanol, and isobutanol); polyisocyanates; dialdehydes; and other crosslinking agents known to those of ordinary skill in the art.

In embodiments including a crosslinked polymeric material and a crosslinking agent, the weight ratio of the polymeric material to the crosslinking agent may vary for a variety of reasons including, but not limited to, the functional-group content of the polymer, its molecular weight, the reactivity and functionality of the crosslinking agent, the desired rate of crosslinking, the degree of stiffness/hardness desired in the polymeric material, and the temperature at which the crosslinking reaction may occur. Non-limiting examples of ranges of weight ratios between the polymeric material and the crosslinking agent include from 100:1 to 50:1, from 20:1 to 1:1, from 10:1 to 2:1, and from 8:1 to 4:1.

Other classes of polymers that may be suitable for use in a release layer may include, but are not limited to, polyamines (e.g., poly(ethylene imine) and polypropylene imine (PPI)); polyamides (e.g., polyamide (Nylon), poly($\in$-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly (N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly (isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly (ethylene oxide) (PEO), poly(propylene oxide) (PPO), poly (tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

In some embodiments, the molecular weight of a polymer may be chosen to achieve a particular adhesive affinity and can vary in a release layer. For example, the molecular weight of a polymer used in a release layer may be between about 1,000 g/mol and about 5,000 g/mol, between about 5,000 g/mol and about 10,000 g/mol, between about 10,000 g/mol and about 20,000 g/mol, between about 20,000 g/mol and about 50,000 g/mol, between about 50,000 g/mol and about 100,000 g/mol, or between about 100,000 g/mol and about 200,000 g/mol. Other molecular weight ranges are also possible. In some embodiments, the molecular weight of a polymer used in a release layer may be greater than or equal to about 1,000 g/mol, greater than or equal to about 5,000 g/mol, greater than or equal to about 10,000 g/mol, greater than or equal to about 15,000 g/mol, greater than or equal to about 20,000 g/mol, greater than or equal to about 25,000 g/mol, greater than or equal to about 30,000 g/mol, greater than or equal to about 50,000 g/mol, greater than or equal to about 100,000 g/mol or greater than or equal to about 150,000 g/mol. In certain embodiments, the molecular weight of a polymer used in a release layer may be less than or equal to about 150,000 g/mol, less than or equal to about 100,000 g/mol, less than or equal to about 50,000 g/mol, less than or equal to about 30,000 g/mol, less than or equal to about 25,000 g/mol, less than or equal to about 20,000 g/mol, less than less than or equal to about 10,000 g/mol, about 5,000 g/mol, or less than or equal to about 1,000 g/mol. Other ranges are also possible. Combinations of the above-referenced ranges are also possible (e.g., greater than or equal to about 5,000 g/mol and less than or equal to about 50,000 g/mol).

When polymers are used, the polymer may be substantially crosslinked, substantially uncrosslinked, or partially crosslinked as the current disclosure is not limited in this fashion. Further, the polymer may be substantially crystalline, partially crystalline, or substantially amorphous. Without wishing to be bound by theory, embodiments in which the polymer is amorphous may exhibit smoother surfaces since crystallization of the polymer may lead to increased surface roughness. In certain embodiments, the release layer is formed of or includes a wax.

The polymer materials listed above and described herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

In certain embodiments, all or part of the release layer can be formed of a material with a bulk electronic resistivity of at least about $10^4$, at least about $10^5$, at least about $10^{10}$, at least about $10^{15}$, or at least about $10^{20}$ Ohm-meters.

In some embodiments, a polymer and/or release layer described herein includes a filler, such as an inorganic filler (e.g., SiO$_2$ or alumina). In certain cases, conductive fillers may be added to the material used to form a release layer. Conductive fillers can increase the electrically conductive properties of the material of the release layer and may include, for example, conductive carbons such as carbon black (e.g., Vulcan XC72R carbon black, Printex Xe-2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, metal mesh. In some embodiments, a conductive filler may include a conductive polymer. A non-conductive or a semi-conductive filler (e.g., silica particles) can also be included in a release layer. Other fillers are also possible.

The amount of filler in a release layer, if present, may be present in the range of, for example, 5-10%, 10-90% or 20-80% by weight of the release layer (e.g., as measured after an appropriate amount of solvent has been removed from the release layer and/or after the layer has been appropriately cured). For instance, the release layer may include a conductive filler in the range of 20-40% by weight, 20-60% by weight, 40-80% by weight, 60-80% by weight of the release layer.

In one set of embodiments, a release layer includes a surfactant. The surfactant may be, for example, an anionic surfactant, a cationic surfactant, a non-ionic surfactant, or a zwitterionic surfactant. Non-limiting examples of anionic surfactants include perfluorooctanoate, perfluorooctanesulfonate, sodium dodecyl sulfate, ammonium lauryl sulfate, and other alkyl sulfate salts, sodium laureth sulfate, alkyl benzene sulfonate, other soaps or fatty acid salts, and derivatives thereof. Non-limiting examples of cationic surfactants include cetyl trimethylammonium bromide and other alkyltrimethylammonium salts, cetylpyridinium chloridem, polyethoxylated tallow amine, benzalkonium chloride, benzethonium chloride, and derivatives thereof. Non-limiting examples of non-ionic surfactants include alkyl poly(ethylene oxide) (e.g., 4-(1,1,3,3-tetramethylbutyl)phenyl-polyethylene glycol, t-octylphenoxypolythoxyethanol, polyethylene glycol tert-octylphenyl ether), alkylphenol poly(ethylene oxide), copolymers of poly(ethylene oxide) and poly(propylene oxide), akyl polyglucosides (e.g., octyl glucoside and decyl maltoside), fatty alcohols (e.g., cetyl alcohol and oleyl alcohol), cocamide MEA or DEA, polysorbates (e.g., Tween 20, Tween 80), dodecyl dimethylamine oxide, and derivatives thereof. Non-limiting examples of zwitterionic surfactants include dodecyl betaine, cocamidopropyl betaine, and coco ampho glycinate, and derivatives thereof.

The amount of surfactant in a release layer, if present, may be present in the range of, for example, 0.01-10% by weight of the release layer (e.g., as measured after an appropriate amount of solvent has been removed from the release layer and/or after the layer has been appropriately cured).

In certain embodiments, a release layer includes a polymer and one or more solvents. In some cases, the polymer is a polymer gel that is swollen by a solvent. In one particular embodiment, the release layer is included in the electrochemical cell and is swollen in the electrolyte solvent. However, in other embodiments, the polymer is non-swellable in the electrolyte solvent. In some instances, the release layer includes pores in which solvent can reside when the release layer is incorporated into an electrochemical cell. Various solvents, such as electrolyte solvents described in more detail herein, can be used.

The particular solvent or solvent combination used with a polymer may depend on, for example, the type and amounts of any other materials in the formulation, the method of applying the formulation to the cell component, the inertness of the solvent with respect to other components of the electrochemical cell (e.g., current collector, electroactive material, electrolyte). For example, a particular solvent or solvent combination may be chosen based in part on its ability to solvate or dissolve any other materials (e.g., a polymer, filler, etc.) in the formulation. In some cases, one or more solvents used can wet (and activate) a surface of a release layer to promote adhesion, but does not penetrate across the release layer. A combination of such and other factors may be taken into consideration when choosing appropriate solvents.

Non-limiting examples of suitable solvents may include aqueous liquids, non-aqueous liquids, and mixtures thereof. In some embodiments, solvents that may be used for a release layer include, for example, water, methanol, ethanol, isopropanol, propanol, butanol, tetrahydrofuran, dimethoxyethane, acetone, toluene, xylene, acetonitrile, cyclohexane, and mixtures thereof can be used. Additional examples of non-aqueous liquid solvents include, but are not limited to, N-methyl acetamide, acetonitrile, acetals, ketals, esters, carbonates, sulfones, sulfites, sulfolanes, sulfoxides, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are may also be used. Of course, other suitable solvents can also be used as needed. Additional examples of solvents, such as electrolyte solvents that may optionally contain one or more salts, are described in more detail herein.

A release layer may be deposited by any suitable method. Examples of methods for depositing a release layer include spin casting, doctor blading, flash evaporation, electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. A method for depositing a release layer in the form of a crosslinked polymer layer includes flash evaporation methods, for example, as described in U.S. Pat. No. 4,954,371 to Yializis. A method for depositing a release layer in the form of a crosslinked polymer layer comprising lithium salts may include flash evaporation methods, for example, as described in U.S. Pat. No. 5,681,615 to Afftnito et al. The technique used for depositing a release layer may depend on the type of material being deposited, the thickness of the layer, etc. Other techniques are also possible.

In certain embodiments, a release layer is fabricating by first forming a release layer formulation, and then positioning the release layer formulation on a surface (e.g., a surface of a carrier substrate) by a suitable method. In some cases, the release layer formulation is in the form of a slurry. The slurry may include any suitable solvent that can at least partially dissolve or disperse the release layer material (e.g., a polymer). For example, a release layer predominately formed of a hydrophobic material may include an organic solvent in the slurry, whereas a release layer predominately formed of a hydrophilic material may include water in the slurry. In certain embodiments, the slurry can include other solvents in addition to, or in place of, water (e.g., other solvents that can form a hydrogen bond), which can result in favorable interactions with components of the release layer. For example, alcohols such as methanol, ethanol, butanol, or isopropanol can be used. In some cases, a release layer slurry includes at least 10 wt %, at least 15 wt %, at least 20 wt %, at least 20 wt %, at least 30 wt %, at least 40 wt %, or any other appropriate weight percent of an alcohol. Other solvents such as organic acids, esters, glymes, and ethers can also be used alone or in combination with other solvents, in certain embodiments.

Mixing of the various components can be accomplished using any of a variety of methods known in the art so long as the desired dissolution, dispersion, or suspension of the components is obtained. Suitable methods of mixing include, but are not limited to, mechanical agitation, grinding, ultrasonication, ball milling, sand milling, and impingement milling.

Mixing of the various components can occur at various temperatures. For instance, the various components such as a polymeric material and a solvent may be mixed at a temperature of greater than or equal to 25° C., greater than or equal to 50° C., greater than or equal to 70° C., or greater than or equal to 90° C. for a suitable amount of time to obtain a desired dissolution or dispersion of components. In some embodiments, various components such as a polymeric material and a solvent may be mixed at a temperature of less than or equal to 50° C., less than or equal to 70° C., or less than or equal to 90° C. for a suitable amount of time to obtain a desired dissolution or dispersion of components. Mixing at such and other temperatures may be performed until the polymer is dissolved and/or dispersed as desired. This solution/dispersion can optionally be mixed with other components of the release layer (e.g., a conductive filler, solvent, crosslinker, etc.), e.g., at a suitable temperature, to form a release layer slurry.

A release layer formulation may be positioned on a surface by any suitable method. In certain embodiments, a release layer formulation is positioned on a surface by slot die coating or reverse roll coating. In each of these methods, the release layer formulation can be delivered as a slurry to a surface such as a carrier substrate, which may then optionally undergo any number of curing, drying, and/or treatment steps, prior to the deposition of another layer on top of the release layer. In some embodiments, the thickness of the coating, mechanical integrity, and/or coating uniformity may be tailored by varying the parameters of the coating method used.

Several aspects of the coating method can be controlled to produce a suitable release layer. When coating a very thin release layer, the mechanical integrity may be dependent on coating uniformity. Both particulate contamination and undesired precipitation from solution can lead to poor mechanical properties in the final release layer. To prevent these defects, several steps can be taken. For example, a method may involve keeping the surface to be coated with the release layer substantially free of static charging, which can affect the adhesion of the release layer to that surface, and can additionally attract unwanted particulate contaminants on the surface. Static charging can be reduced or eliminating by applying static strings to the substrate unwind, or controlling the electronic state of the coat rolls (e.g., attached to ground, floating, biased). A method can also be employed to prevent unwanted precipitation out of the coating solution, e.g., by employing continuous mixing to prevent coagulation. Other techniques are also known to those by ordinary skill in the art.

In one set of embodiments, slot die coating is used to form a release layer coating on a surface. In slot die coating, a fluid is delivered by a pump to a die which in turn delivers the coating fluid to the desired substrate. The die will usually include three pieces: a top, a bottom, and an internal shim. Either the top or bottom may include a well or reservoir to hold fluid and spread it across the width of the die. The shim determines both the size of the gap between the top and bottom plates as well as defining the coating width.

Thickness of the coating in this case may depend mainly on three factors: the rate at which fluid is delivered to the die (pump speed), the speed at which the substrate is moving past the die lips (line speed), and the size of the gap in the die lips (slot height). Thickness will additionally depend on the inherent properties of the solution to be coated such as viscosity and percent solids.

The uniformity of the coating will be directly related to how well the internal manifold in the die distributes the fluid across the substrate. To control coating uniformity, several steps can be taken. For example, the shape of the reservoir can be adjusted to equalize pressure across the width of the die. The shape of internal shim can be adjusted to account for pressure variations due to the position of the fluid inlet. The internal shim thickness can also be adjusted to produce higher or lower pressure drops between the fluid inlet and the die lips. The pressure drop will determine the residence time of the fluid in the die and can be used to influence coating thickness and prevent problems such as dry out in the die.

In another set of embodiments, reverse roll coating is used to form a release layer coating on a surface. In one embodiment, a three roll reverse roll coater fluid is picked up by a first roller (metering roller), transferred in a controlled fashion to a second roller (application roller), and then wiped off of the second roller by the substrate as it travels by. More rollers can be used employing a similar technique. The coating fluid is delivered to a reservoir by a pump; the metering roller is positioned so that it is partially submerged in the coating fluid when the pan is filled. As the metering roller spins the application roller is moved (or vice versa) so that fluid is transferred between the two.

The amount of fluid, and in turn the final coat thickness of the release layer, is partially determined by the amount of fluid transferred to the application roller. The amount of fluid transfer can be affected by changing the gaps between the rollers or by applying a doctor blade at any point in the process. Coating thickness is also affected by line speed in a way similar to slot die coating. Coating uniformity in the case of reverse roll coating may depend mainly on the uniformity of the coat rolls and the doctor blade(s) if any are used. Determining suitable compositions, configurations (e.g., crosslinked or substantially uncrosslinked) and dimensions of release layers can be carried out by those of ordinary skill in the art, without undue experimentation. As described herein, a release layer may be chosen based on, for example, its inertness in the electrolyte and whether the release layer is to be incorporated into the final electrode or electrochemical cell, amongst other factors. The particular materials used to form the release layer may depend on, for example, the material compositions of the layers to be positioned adjacent the release layer and its adhesive affinity to those layers, as well as the thicknesses and method(s) used to deposit each of the layers. The dimensions of the release layer may be chosen such that the electrochemical cell has a low overall weight, while providing suitable release properties or other properties during fabrication.

One simple screening test for choosing appropriate materials for a release layer may include forming the release layer and immersing the layer in an electrolyte and observing whether inhibitory or other destructive behavior (e.g., disintegration) occurs compared to that in a control system. The same can be done with other layers (e.g., a protective layer, an electroactive material layer) attached to the release layer. Another simple screening test may include forming an electrode including the one or more release layers and immersing the electrode in the electrolyte of the battery in the presence of the other battery components, discharging/charging the battery, and observing whether specific discharge capacity is higher or lower compared to a control system. A high discharge capacity may indicate no or minimal adverse reactions between the release layer and other components of the battery.

To test whether a release layer has adequate adhesion to one surface but relatively low adhesion to another surface to allow the release layer to be released, the adhesiveness or force required to remove a release layer from a unit area of a surface can be measured (e.g., in units of $N/m^2$). Adhesiveness can be measured using a tensile testing apparatus or another suitable apparatus. Such experiments can optionally be performed in the presence of a solvent (e.g., an electrolyte) or other components (e.g., fillers) to determine the influence of the solvent and/or components on adhesion. In some embodiments, mechanical testing of tensile strength or shear strength can be performed. For example, a release layer may be positioned on a first surface and opposite forces can be applied until the surfaces are no longer joined. The (absolute) tensile strength or shear strength is determined by measuring the maximum load under tensile or shear, respectively, divided by the interfacial area between the articles (e.g., the surface area of overlap between the articles). The normalized tensile strength or shear strength can be determined by dividing the tensile strength or shear strength, respectively, by the mass of the release layer applied to the articles. In one set of embodiments, a "T-peel test" is used. For example, a flexible article such as a piece of tape can be positioned on a surface of the release layer, and the tape can be pulled away from the surface of the other layer by lifting one edge and pulling that edge in a direction approximately perpendicular to the layer so that as the tape is being removed, it continually defines a strip bent at approximately 90 degrees to the point at which it diverges from the other layer. In other embodiments, relative adhesion between layers can be determined by positioning a release layer between two layers (e.g., between a carrier substrate and a current collector), and a force applied until the surfaces are no longer joined. In some such embodiments, a release layer that adheres to a first surface but releases from a second surface, without mechanical disintegration of the release layer, may be useful as a release layer for fabricating components of an electrochemical cell. The effectiveness of an adhesion promoter to facilitate adhesion between two surfaces can be tested using similar methods. Other simple tests are known and can be conducted by those of ordinary skill in the art.

The percent difference in adhesive strength between the release layer and the two surfaces in which the release layer is in contact may be calculated by taking the difference between the adhesive strengths at these two interfaces. For instance, for a release layer positioned between two layers (e.g., between a carrier substrate and a protective layer), the adhesive strength of the release layer on the first layer (e.g., a carrier substrate) can be calculated, and the adhesive strength of the release layer on the second layer (e.g., a protective layer) can be calculated. The smaller value can then be subtracted from the larger value, and this difference divided by the larger value to determine the percentage difference in adhesive strength between each of the two layers and the release layer. In some embodiments, this percent difference in adhesive strength is greater than or equal to about 20%, greater than or equal to about 30%, greater than or equal to about 40%, greater than or equal to about 50%, greater than or equal to about 60%, greater than or equal to about 70%, or greater than or equal to about 80%. The percentage difference in adhesive strength may be tailored by methods described herein, such as by choosing appropriate materials for each of the layers.

Adhesion and/or release between a release layer and components of an electrochemical cell (including a second release layer, a protective layer, or a carrier substrate) may involve associations such as adsorption, absorption, Van der Waals interactions, hydrogen bonding, covalent bonding, ionic bonding, cross linking, electrostatic interactions, and combinations thereof. The type and degree of such interactions can also be tailored by methods described herein.

In embodiments in which the release layer is incorporated into the final electrode structure, it may be desirable to provide a release layer capable of functioning as a separator within an electrochemical cell. In such an embodiment, the release layer is conductive to the electroactive species of the electrochemical cell. Conductivity of the release layer may, for example, be provided either through intrinsic conductivity of the material in the dry state, or the release layer may comprise a polymer that is capable of being swollen by an electrolyte to form a gel polymer exhibiting conductivity in the wet state. While materials exhibiting any amount of ion conductivity could be used in such an embodiment, in some embodiments, the release layer is made from a material that may exhibit conductivities of, e.g., greater than or equal to about $10^{-7}$ S/cm, greater than or equal to about $10^{-6}$ S/cm, greater than or equal to about $10^{-5}$ S/cm, greater than or equal to about $10^{-4}$ S/cm, greater than or equal to about $10^{-3}$ S/cm, greater than or equal to about $10^{-2}$ S/cm, greater than or equal to about $10^{-1}$ S/cm, greater than or equal to about 1 S/cm, greater than or equal to about $10^{1}$ S/cm, greater than or equal to about $10^{2}$ S/cm, greater than or equal to about $10^{3}$ S/cm, greater than or equal to about $10^{4}$ S/cm, or any other appropriate conductivity in either the dry or wet state. Correspondingly, the release layer may exhibit conductivities of less than or equal to about $10^{4}$ S/cm, less than or equal to about $10^{3}$ S/cm, less than or equal to about $10^{2}$ S/cm, less than or equal to about 10 S/cm, less than or equal to about $10^{-1}$ S/cm, less than or equal to about $10^{-2}$ S/cm, less than or equal to about $10^{-3}$ S/cm, or any other appropriate conductivity in either the dry or wet state. Combinations of the above are possible (e.g., a conductivity of greater than or equal to about $10^{-4}$ S/cm and less than or equal to about $10^{-1}$ S/cm). Other ranges are also possible. In certain embodiments, the release layer comprises pores through which an electrolyte can reside, allowing an ion conductivity of one or more the above-referenced ranges across the release layer.

Referring again to FIG. 2, to provide a smooth surface upon which to deposit the protective layer, it is desirable that surface 5 opposite the first carrier substrate corresponding to the interface between the release layer and protective layer exhibit a low surface roughness. In one set of embodiments, the surface of the release layer and the corresponding interface formed after deposition of the protective layer have a mean peak to valley roughness ($R_z$) of less than or equal to about 2 µm, less than or equal to about 1.5 µm, less than or equal to about 1 µm, less than or equal to about 0.9 µm, less than or equal to about 0.8 µm, less than or equal to about 0.7 µm, less than or equal to about 0.6 µm, less than or equal to about 0.5 µm, or any other appropriate roughness. Correspondingly, the surface of the release layer and the corresponding interface may exhibit an $R_z$ or greater than or equal to about 50 nm, greater than or equal to about 0.1 µm, greater than or equal to about 0.2 µm, greater than or equal to about 0.4 µm, greater than or equal to about 0.6 µm, greater than or equal to about 0.8 µm, greater than or equal to about 1 µm, or any other appropriate roughness. Combinations of the above-noted ranges are possible (e.g., an $R_z$ of greater than or equal to about 0.1 µm and less than or equal to about 1 µm). Other ranges are also possible.

The release layer may be any appropriate thickness to separate the protective layer from the underlying substrate and provide a smooth surface upon which to deposit the protective layer. In one embodiment, the thickness of the release layer is greater than or equal to about 1, greater than or equal to about 2, greater than or equal to about 3, or greater than or equal to about 4 times the mean peak to valley surface roughness of the underlying carrier substrate. In embodiments in which the release layer functions as a separator and/or other component (e.g., an electrolyte) in the final electrode structure, thicker release layers may be desired. In view of the above, depending upon the particular carrier substrate used and the intended function of the release layer, the release layer thickness may be greater than or equal to about 0.1 µm, greater than or equal to about 0.2 µm, greater than or equal to about 0.3 µm, greater than or equal to about 0.4 µm, greater than or equal to about 0.5 µm, greater than or equal to about 0.6 µm, greater than or equal to about 0.7 µm, greater than or equal to about 0.8 µm, greater than or equal to about 0.9 µm, greater than or equal to about 1 µm, greater than or equal to about 2 µm, greater than or equal to about 3 µm, greater than or equal to about 4 µm, greater than or equal to about 5 µm, greater than or equal to about 10 µm, greater than or equal to about 20 µm, or any other appropriate thickness. Correspondingly, the release layer thickness may be less than or equal to about 100 µm, less than or equal to about 50 µm, less than or equal to about 20 µm, less than or equal to about 10 µm, less than or equal to about 5 µm, less than or equal to about 4 µm, less than or equal to about 3 µm, less than or equal to about 2 µm, less than or equal to about 1 µm, or any other appropriate thickness. Combinations of the above noted ranges are possible (e.g., a release layer may have a thickness greater than or equal to about 0.1 µm and less than or equal to about 1 µm). Other ranges are also possible.

In addition to the above, in embodiments in which the release layer is incorporated into the final electrode structure, the release layer will contribute to the cell internal resistance. Therefore, in some (but not all) embodiments, it may be desirable to limit the thickness of the release layer relative to the thickness of the desired protective layer to limit the increase in the cell internal resistance. In certain embodiments, the thickness of the release layer may be less than or equal to about 1, less than or equal to about 0.9, less than or equal to about 0.8, less than or equal to about 0.7, less than or equal to about 0.6, less than or equal to about 0.5, less than or equal to about 0.4, less than or equal to about 0.3, or less than or equal to about 0.2 times the thickness of the protective layer. Correspondingly, the thickness of the release layer may be greater than or equal to about 0.1, greater than or equal to about 0.2, greater than or equal to about 0.3, greater than or equal to about 0.4, or greater than or equal to about 0.5 times the thickness of the protective layer. Combinations of the above are possible (e.g., the thickness of the release layer may be greater than or equal to about 0.4 and less than or equal to about 0.6 times the thickness of the protective layer). Other ranges are also possible.

In certain embodiments in which the release layer is incorporated into the final electrode structure (e.g., an anode) or electrochemical cell, the release layer (e.g., a polymer layer or other suitable material) may have an affinity to one electrolyte solvent of a heterogeneous electrolyte such that during operation of the electrochemical cell, a first electrolyte solvent resides disproportionately at the anode, while the a second electrolyte solvent is substantially excluded from the release layer (and may be present disproportionately at the cathode).

Because the first electrolyte solvent is present closer to the anode, it is generally chosen to have one or more characteristics such as low reactivity to the electroactive material (e.g., in the case of the electroactive material being lithium, the first electrolyte may enable high lithium cycle-ability), reasonable ion (e.g., lithium ion) conductivity, and in the case of a Li—S cell, relatively lower polysulfide solubility than the second electrolyte solvent (since polysulfides can react with lithium). The second electrolyte solvent may be present disproportionately at the cathode and, for example, may reside substantially in a separator, a polymer layer adjacent the cathode, and/or in a electroactive material layer of the cathode (e.g., cathode active material layer). In some instances, the second electrolyte solvent is essentially free of contact with the anode. The second electrolyte solvent may have characteristics that favor better cathode performance such as, e.g., for a Li—S cell, high polysulfide solubility, high rate capability, high sulfur utilization, and high lithium ion conductivity, and may have a wide liquid state temperature range. In some cases, the second electrolyte solvent has a higher reactivity to lithium than the first electrolyte solvent. It may be desirable, therefore, to cause the second electrolyte solvent to be present at the cathode (i.e., away from the anode) during operation of the battery, thereby effectively reducing its concentration, and reactivity, at the anode.

As described above, the first electrolyte solvent of a heterogeneous electrolyte may be present disproportionately at the anode by residing in a polymer layer (e.g., positioned adjacent a protective layer or a multilayer protective layer). Accordingly, the material composition of the release layer may be chosen such that the material has a relatively higher affinity to (high solubility in) the first electrolyte solvent compared to the second electrolyte solvent. For instance, in some embodiments, the release layer is prepared in the form of a gel by mixing a monomer, a first electrolyte solvent, and optionally other components (e.g., a crosslinking agent, lithium salts, etc.) and disposing this mixture on the anode. The monomer can be polymerized by various methods (e.g., using a radical initiator, ultra violet radiation, an electron beam, or catalyst (e.g., an acid, base, or transition metal catalyst)) to form a gel electrolyte. Polymerization may take place either before or after disposing the mixture on the anode. After assembling the other components of the electrode as described herein, and assembly of the battery, the battery can be filled with the second electrolyte solvent. The second electrolyte solvent may be excluded from the release layer (e.g., due to the high affinity of the polymer with the first electrolyte solvent already present in the release layer and/or due to immiscibility between the first and second electrolyte solvents).

In another embodiment, a release layer is formed at the anode as described herein, and is dried prior to assembly of the battery. The battery can then be filled with a heterogeneous electrolyte including the first and second electrolyte solvents. If the release layer is chosen such that it has a higher affinity towards the first electrolyte solvent (and/or the separator and/or cathode may have a higher affinity towards the second electrolyte solvent), at least portions of the first and second electrolyte solvents can partition once they are introduced into the battery. In yet another embodiment, partitioning of the first and second electrolyte solvents can take place after commencement of first discharge of the battery. For example, as heat is produced while operating the battery, the affinity between the release layer and the first electrolyte solvent can increase (and/or the affinity between the separator and/or cathode and the second electrolyte solvent can increase). Thus, a greater degree of partitioning of the electrolyte solvents can occur during operation of the battery. Additionally, at lower temperatures, the effect may be irreversible such that the first electrolyte solvent is trapped within the release layer, and the second electrolyte solvent is trapped within the pores of the separator and/or cathode. In some cases, the components of the battery (e.g., the release layer) may be pretreated (e.g., with heat) prior to use to affect the desired degree of polymer/electrolyte solvent interaction. Other methods of partitioning the electrolyte solvents are also possible.

In another embodiment, the release layer is deposited at the anode as described herein, and the anode (including the release layer) is exposed to a first electrolyte solvent. This exposure can cause the first electrolyte solvent to be absorbed in the release layer. The battery can be formed by positioning a cathode adjacent the anode such that the release layer is positioned between the anode and cathode. The cathode can then be exposed to a second electrolyte solvent, e.g., such that at least a portion of the second electrolyte solvent is absorbed in the cathode. In other embodiments, the cathode can be exposed to the second electrolyte solvent prior to assembly of the anode and cathode. Optionally, the cathode may include a polymer layer that preferentially absorbs the second electrolyte solvent more than the first electrolyte solvent. In some embodiments, e.g., by choosing appropriate release layer(s) and/or materials used to form the anode and/or cathode, at least portions of the first and second electrolyte solvents can be separated within the battery. For instance, a higher proportion of the first electrolyte solvent may reside at the anode and a higher proportion of the second electrolyte solvent may reside at the cathode.

In certain embodiments in which the release layer is incorporated into the final electrode structure and/or electrochemical cell, the release layer is designed to have the ability to withstand the application of a force or pressure applied to the electrochemical cell or a component of the cell during cycling of the cell. The pressure may be an externally-applied (e.g., in some embodiments, uniaxial) pressure. The externally-applied pressure may, in some embodiments, be chosen to be greater than the yield stress of a material forming the electroactive material layer. For example, in embodiments in which the electroactive material layer comprises lithium, the applied pressure applied to the cell may be greater than or equal to about 5 $kg/cm^2$. In some embodiments, the applied pressure may be greater than or equal to about 5 $kg/cm^2$, greater than or equal to about 6 $kg/cm^2$, greater than or equal to about 7 $kg/cm^2$, greater than or equal to about 8 $kg/cm^2$, greater than or equal to about 9 $kg/cm^2$, or any other appropriate pressure. Correspondingly, the applied pressure may be less than or equal to about 20 $kg/cm^2$, less than or equal to about 10 $kg/cm^2$, less than or equal to about 9 $kg/cm^2$, less than or equal to about 8 $kg/cm^2$, less than or equal to about 7 $kg/cm^2$, less than or equal to about 6 $kg/cm^2$, or any other appropriate pressure. Combinations of the above are possible (e.g. an applied pressure of greater than or equal to about 5 $kg/cm^2$ and less than or equal to about 10 $kg/cm^2$). Other ranges are also possible. Suitable structures for applying an appropriate pressure to the electrochemical cell are described in more detail in U.S. patent application Ser. No. 12/862,528, filed on Aug. 24, 2010, published as U.S. Pub. No. 2011/0177398, entitled "Electrochemical Cell", which is incorporated herein by reference in its entirety for all purposes.

In certain embodiments, an electrochemical cell includes a first electrode comprising an electroactive material (e.g., lithium), a second electrode, and a protective layer positioned between the first and second electrodes. The protective layer (e.g., a ceramic, glass, or glassy-ceramic material layer) may have a thickness of less than or equal to 2 microns. In some instances, a mean peak to valley roughness of the protective layer is between about 0.1 µm and about 1 µm. The release layer may be positioned adjacent a release layer (e.g., a polymeric release layer). The release layer may have an ion conductivity (e.g., a lithium ion conductivity) of greater than or equal to about $10^{-5}$ S/cm in either the dry or wet state. The thickness of the release layer may be, for example, greater than or equal to about 0.1 µm and less than or equal to about 20 µm (e.g., greater than or equal to about 1 µm and less than or equal to about 10 µm). In some embodiments, the release layer includes pores or interstices where a liquid electrolyte can reside. The liquid electrolyte may include, in some embodiments, a salt (e.g., a lithium salt) that can enhance ion conductivity across the release layer.

In certain embodiments, the electrochemical cell that has an anisotropic force with a component normal to an active surface of an electrode (e.g., a first electrode) applied to it. The component of the anisotropic force normal to the active surface may, for example, define a pressure of at least about 4.9 and less than about 250 Newtons per square centimeter. The release layer may have a yield strength at least or greater than the normal component of the force applied to the cell.

It should be appreciated that while several embodiments herein describe a release layer positioned between a carrier substrate and a protective layer, a release layer may be positioned between other layers of an electrode structure and/or an electrochemical cell. For instance, in some embodiments, a release layer may be positioned between a carrier substrate and a separator. In some cases, a release layer may be positioned between a current collector and an electrode. In another example, a release layer may be positioned between a cathode (e.g., a second electrode) and an anode (e.g., a first electrode). In certain instances, a release layer may be positioned between an electrode and a protective layer. Other positions of the release layer are also possible. In some embodiments, more than one release layer may be present in an electrode structure and/or an electrochemical cell. The more than one release layers may be adjacent one another, or separated from one another by one or more intervening layers.

As shown illustratively in FIG. 2, protective layer 6 may be disposed on surface 5 of the release layer. Without wishing to be bound by theory, for thinner protective layers (e.g., thicknesses on the order of the roughness of the underlying release layer), the mean peak to valley roughness of the protective layer may be substantially similar to that of the interface between the protective layer and the release layer. Therefore, when the protective layer thickness is less than the roughness of the protective layer, it is possible that defects and/or gaps might be present in the protective layer as noted above with regards to FIGS. 1A-1B. Consequently, in at least one embodiment, it is desirable that the protective layer thickness be greater than about the mean peak to valley roughness of the protective layer, the surface of the release layer, and/or the interface with the release layer to provide a substantially continuous protective layer. In some embodiments, the protective layer thickness may be greater than or equal to about 1 times, greater than or equal to about 2 times, greater than or equal to about 3 times, or greater than or equal to about 4 times the mean peak to valley roughness of the protective layer, the surface of the release layer, and/or the interface with the release layer to further ensure a substantially continuous protective layer. In some embodiments, the protective layer thickness may be less than or equal to about 10 times, less than or equal to about 7 times, less than or equal to about 5 times, less than or equal to about 3 times, or less than or equal to about 2 times the mean peak to valley roughness of the protective layer, the surface of the release layer, and/or the interface with the release layer. Combinations of the above-referenced ranges are also possible (e.g., greater than or equal to about 1 time and less than or equal to about 5 times the mean peak to valley roughness of the protective layer, the surface of the release layer, and/or the interface with the release layer). Other ranges are also possible.

In one exemplary embodiment, surface 5 of the release layer, the protective layer 6, and/or the interface between the release layer 4 and protective layer 6 may exhibit a mean peak to valley roughness between about 0.1 µm to about 1 µm. In such an embodiment, the protective layer thickness may range, for instance, between about 0.1 µm to about 2 µm. For example, if a desired protective layer thickness was about 1 µm to about 2 µm, the mean peak to valley roughness of surface 5 of the release layer, the protective layer 6, and/or the interface between the release layer 4 and protective layer 6 may be less than about 1 µm, in some embodiments.

In view of the above, the thickness of the protective layer may be less than or equal to about 5 µm, less than or equal to about 2 µm, less than or equal to about 1.5 µm, less than or equal to about 1.4 µm, less than or equal to about 1.3 µm, less than or equal to about 1.2 µm, less than or equal to about 1.1 µm, less than or equal to about 1 µm, less than or equal to about 0.9 µm, less than or equal to about 0.8 µm, less than or equal to about 0.7 µm, less than or equal to about 0.6 µm, less than or equal to about 0.5 µm, less than or equal to about 0.4 µm, less than or equal to about 0.3 µm, less than or equal to about 0.2 µm, less than or equal to about 0.1 µm, less than or equal to about 50 nm, less than or equal to about 30 nm, or any other appropriate thickness. Correspondingly, the thickness of the protective layer may be greater than or equal to about 10 nm, greater than or equal to about 30 nm, greater than or equal to about 50 nm, greater than or equal to about 0.1 µm, greater than or equal to about 0.2 µm, greater than or equal to about 0.3 µm, greater than or equal to about 0.4 µm, greater than or equal to about 0.6 µm, greater than or equal to about 0.8 µm, greater than or equal to about 1 µm, greater than or equal to about 1.2 µm, greater than or equal to about 1.4 µm, greater than or equal to about 1.5 µm, or any other appropriate thickness. Combinations of the above are possible (e.g., a thickness of the protective layer may be less than or equal to about 2 µm and greater than or equal to about 0.1 µm). Other ranges are also possible.

The protective layer may be made from any suitable material capable of acting as a protective layer for the underlying electrode structure and that is conductive to the electroactive species. The protective layer may also be referred to as a "single-ion conductive material layer". In some embodiments, the protective layer is a solid. In some embodiments, the protective layer comprises or may be substantially formed of a non-polymeric material. For example, the protective layer may comprise or may be substantially formed of an inorganic material. Depending on the particular embodiment, the protective layer may be either electrically insulating or electrically conducting. In some embodiments, the protective layer is a ceramic, a glassy-ceramic, or a glass. With respect to the current discussion regarding lithium metal based electrode structures, suitable materials for the protective layer may include, but are not limited to, lithium nitride, lithium silicate, lithium borate, lithium aluminate, lithium phosphate, lithium phosphorus oxynitride, lithium silicosulfide, lithium germanosulfide, lithium oxides (e.g., $Li_2O$, $LiO$, $LiO_2$, $LiRO_2$, where R is a rare earth metal), lithium lanthanum oxides, lithium titanium oxides, lithium borosulfide, lithium aluminosulfide, lithium phosphosulfide, and combinations thereof.

A protective layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

In some embodiments, a protective layer that includes some porosity can be treated with a polymer or other material such that pinholes and/or nanopores of the protective layer may be filled with the polymer. Examples of techniques for forming such structures are described in more detail in U.S. patent application Ser. No. 12/862,528, filed on Aug. 24, 2010, published as U.S. Pub. No. 2011/0177398, entitled "Electrochemical Cell", which is incorporated herein by reference in its entirety for all purposes.

Additionally or alternatively, in some embodiments, the protective layer may be a polymer layer that is conductive to the electroactive species. Suitable polymers include, but are not limited to, both electrically conducting and electrically insulating ion conduction polymers. Possible electrically conducting polymers include, but are not limited to, poly (acetylene)s, poly(pyrrole)s, poly(thiophene)s, poly(aniline)s, poly(fluorene)s, polynaphthalenes, poly(p-phenylene sulfide), and poly(para-phenylene vinylene)s. Possible electrically insulating polymers include, but are not limited to, acrylate, polyethyleneoxide, silicones, and polyvinylchlorides. Polymers described herein for release layers can also be used in a protective layer. In some such embodiments, the polymer(s) is present in a non-swollen state (e.g., as a thin film), such as in configurations in which the protective layer comprising the polymer is separated from the electrolyte by a ceramic, glass or glassy-ceramic layer. The above polymers may be doped with ion conducting salts to provide, or enhance, the desired ion conducting properties. Appropriate salts for lithium based cells include, for example, LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$ though other salts may be used for other chemistries. The above materials may be deposited using spin casting, doctor blading, flash evaporation, or any other appropriate deposition technique. In some embodiments, a protective layer is formed of, or includes, a suitable polymeric material listed herein for the release layer, optionally with modified molecular weight, cross-linking density, and/or addition of additives or other components.

In some embodiments, the average ionic conductivity (e.g., lithium ion conductivity) of the protective layer is at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, at least about $10^{-1}$ S/cm, at least about 1 S/cm, or at least about 10 S/cm. The average ionic conductivity may less than or equal to about 20 S/cm, less than or equal to about 10 S/cm, or less than or equal to 1 S/cm. Conductivity may be measured at room temperature (e.g., 25 degrees Celsius).

While a single protective layer has been depicted in the figures, embodiments in which multiple protective layers, or a multilayer protective layer, are used are also envisioned. Possible multilayer structures can include arrangements of polymer layers and single ion conductive layers as described in more detail in U.S. patent application Ser. No. 12/862,528, filed on Aug. 24, 2010, published as U.S. Pub. No. 2011/0177398, entitled "Electrochemical Cell", which is incorporated herein by reference in its entirety for all purposes. For example, a multilayer protective layer may include alternating single-ion conductive layer(s) and polymer layer(s) in some embodiments. Other examples and configurations of possible multilayer structures are also described in more detail in U.S. patent application Ser. No. 11/400,781, filed Apr. 6, 2006, published as U.S. Pub. No. 2007-0221265, and entitled, "Rechargeable Lithium/Water, Lithium/Air Batteries" to Affinito et al., which is incorporated herein by reference in its entirety for all purposes.

A multilayer protective layer can act as a superior permeation barrier by decreasing the direct flow of species to the electroactive material layer, since these species have a tendency to diffuse through defects or open spaces in the layers. Consequently, dendrite formation, self-discharge, and loss of cycle life can be reduced. Another advantage of a multilayer protective layer includes the mechanical properties of the structure. The positioning of a polymer layer adjacent a single-ion conductive layer can decrease the tendency of the single-ion conductive layer to crack, and can increase the barrier properties of the structure. Thus, these laminates may be more robust towards stress due to handling during the manufacturing process than structures without intervening polymer layers. In addition, a multilayer protective layer can also have an increased tolerance of the volumetric changes that accompany the migration of lithium back and forth from the electroactive material layer during the cycles of discharge and charge of the cell.

Turning now to the electroactive material, referring to FIG. 2, the electroactive material layer 8 may be made from any appropriate material used for a desired application. Therefore, while many of the embodiments describe herein refer to lithium as the electroactive material, other electroactive materials are also possible. In some embodiments, the electroactive material is a metal alloy, such as lithium metal doped with Al, Mg, Zn, or Si. Other examples are of alloys are described in more detail in U.S. patent application Ser. No. 12/862,528, filed on Aug. 24, 2010, published as U.S. Pub. No. 2011/0177398, entitled "Electrochemical Cell", which is incorporated herein by reference in its entirety for all purposes. In other embodiments, suitable electroactive materials include a carbon-containing material (e.g., for lithium ion electrochemical cells). Other materials are also possible.

The electroactive material layer may be deposited using physical vapor deposition, sputtering, chemical deposition, electrochemical deposition, thermal evaporation, jet vapor deposition, laser ablation, or any other appropriate method. In an alternative embodiment, the electroactive material layer is deposited on the protective layer by bonding the electroactive material layer to the protective layer. In such an embodiment, a temporary bonding layer might be deposited onto the protective layer prior to bonding the electroactive material layer, or the electroactive material layer might bond directly to the protective layer. In some embodiments, the temporary bonding layer may form an alloy with the electroactive material upon subsequent cycling of the electrode structure in an electrochemical cell. For example, silver and/or other metals that can alloy with lithium can be used in some embodiments. In embodiments in which the protective layer has already been formed or deposited, it may be unnecessary to maintain a low surface roughness on the exposed surface of the electroactive material layer. However, embodiments in which the surface roughness of the electroactive material is controlled are also envisioned.

In certain embodiments, the thickness of the electroactive material layer may vary from, e.g., about 2 to 200 microns. For instance, the electroactive material layer may have a thickness of less than or equal to about 200 microns, less than or equal to about 100 microns, less than or equal to about 75 microns, less than or equal to about 50 microns, less than or equal to about 25 microns, less than or equal to about 10 microns, or less than or equal to about 5 microns. In some embodiments, the electroactive material layer may have a thickness of greater than or equal to about 1 micron, greater than or equal to about 5 microns, greater than or equal to about 15 microns, greater than or equal to about 25 microns, greater than or equal to about 50 microns, greater than or equal to about 75 microns, greater than or equal to about 100 microns, or greater than or equal to about 150 microns. Combinations of the above-referenced ranges are also possible (e.g., greater than or equal to about 25 microns and less than or equal to about 50 microns). Other ranges are also possible. The choice of the thickness may depend on cell design parameters such as the desired cycle life, cell capacity, and the thickness of the cathode electrode.

Figure 2D:
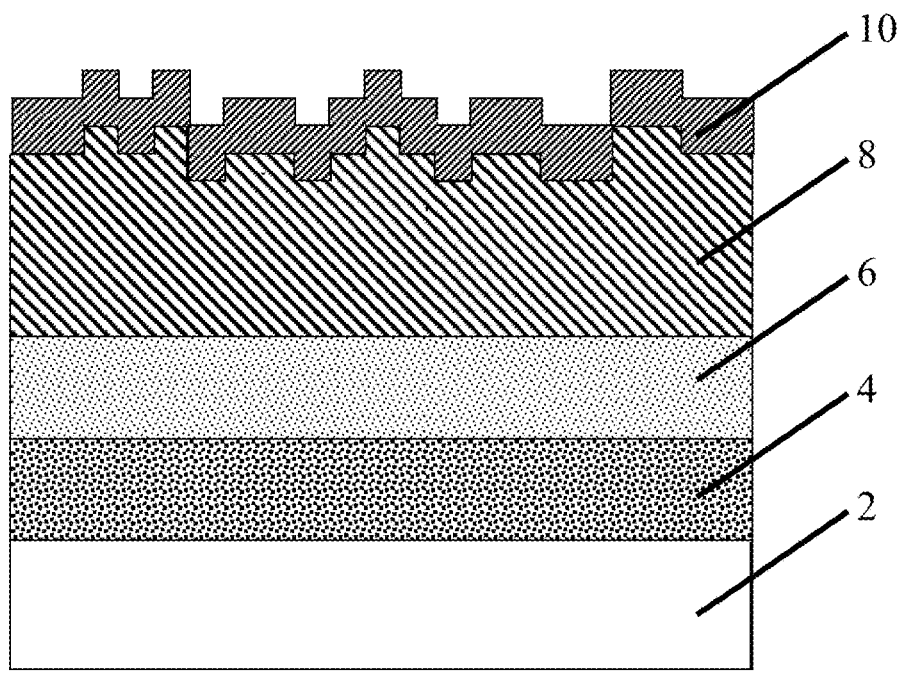
FIG. 2D is a schematic representation of an electrode structure including a current collector, according to one set of embodiments.

In some embodiments, such as that depicted in FIG. 2A, the electroactive material layer functions as both the electroactive material and as a current collector. Alternatively, in some embodiments, such as an electrode structure for a high rate electrochemical cell, it is desirable to include a current collector 10, as depicted in FIG. 2D. In such an embodiment, the current collector functions to collect charge from the electroactive material and conduct that charge to a lead and external contact. In some embodiments, the current collector may also function as a structural element for supporting the electrode structure.

Suitable materials for the current collector include, but are not limited to: metals (e.g., copper, nickel, aluminum, passivated metals, and other appropriate metals); metallized polymers; electrically conductive polymers; polymers including conductive particles dispersed therein; and other appropriate materials. In some embodiments, the current collector is deposited onto the electroactive material layer using physical vapor deposition, chemical vapor deposition, electrochemical deposition, sputtering, doctor blading, flash evaporation, or any other appropriate deposition technique for the selected material. Alternatively, the current collector might be formed separately and bonded to the electrode structure.

As described herein, a release layer may be positioned on a carrier substrate to facilitate fabrication of an electrode. Any suitable material can be used as a carrier substrate. In some embodiments, the material (and thickness) of a carrier substrate may be chosen at least in part due to its ability to withstand certain processing conditions such as high temperature. The substrate material may also be chosen at least in part based on its adhesive affinity to a release layer. In some cases, a carrier substrate is a polymeric material. Examples of suitable materials that can be used to form all or portions of a carrier substrate include certain of those described herein suitable as release layers, optionally with modified molecular weight, cross-linking density, and/or addition of additives or other components. In certain embodiments, a carrier substrate comprises a polyester such as a polyethylene terephthalate (PET) (e.g., optical grade polyethylene terephthalate), polyolefins, polypropylene, nylon, polyvinyl chloride, and polyethylene (which may optionally be metalized). In some cases, a carrier substrate comprises a metal or a ceramic material. In some embodiments, a carrier substrate includes a film that may be optionally disposed on a thicker substrate material. For instance, in certain embodiments, a carrier substrate includes a polymer film or a metalized polymer film (using various metals such as aluminum and copper). A carrier substrate may also include additional components such as fillers, binders, and/or surfactants.

Additionally, a carrier substrate may have any suitable thickness. For instance, the thickness of a carrier substrate may greater than or equal to about 5 microns, greater than or equal to about 15 microns, greater than or equal to about 25 microns, greater than or equal to about 50 microns, greater than or equal to about 75 microns, greater than or equal to about 100 microns, greater than or equal to about 200 microns, greater than or equal to about 500 microns, or greater than or equal to about 1 mm. In some embodiments, the carrier substrate may have a thickness of less than or equal to about 10 mm, less than or equal to about 5 mm, less than or equal to about 3 mm, or less than or equal to about 1 mm. Combinations of the above-referenced ranges are also possible (e.g., greater than or equal to about 100 microns and less than or equal to about 1 mm.) Other ranges are also possible. In some cases, the carrier substrate has a thickness that is equal to or greater than the thickness of the release layer.

In one set of embodiments, the carrier substrate exhibits a surface roughness that is less than or equal to the desired surface roughness of the release layer. Without wishing to be bound by theory, the use of a relatively smooth carrier substrate may desirably enable the use of a thinner release layer to ensure substantially continuous coverage across the carrier substrate deposition surface. In some embodiments, the surface of the carrier substrate may have a mean peak to valley roughness ($R_z$) of less than or equal to about 2 µm, less than or equal to about 1.5 µm, less than or equal to about 1 µm, less than or equal to about 0.9 µm, less than or equal to about 0.8 µm, less than or equal to about 0.7 µm, less than or equal to about 0.6 µm, less than or equal to about 0.5 µm, less than or equal to about 0.4 µm, less than or equal to about 0.3 µm, less than or equal to about 0.2 µm, less than or equal to about 0.1 µm, or any other appropriate roughness. Correspondingly, the surface of the carrier substrate may exhibit an $R_z$ or greater than or equal to about 50 nm, greater than or equal to about 0.1 µm, greater than or equal to about 0.2 µm, greater than or equal to about 0.4 µm, greater than or equal to about 0.6 µm, greater than or equal to about 0.8 µm, greater than or equal to about 1 µm, or any other appropriate roughness. Combinations of the above-noted ranges are possible (e.g., an $R_z$ of greater than or equal to about 0.1 µm and less than or equal to about 1 µm). Other ranges are also possible.

In another set of embodiments, the carrier substrate may exhibit a surface roughness that is greater than the desired surface roughness of the release layer. To obtain the desired surface roughness of the release layer, the thickness of the release layer may be selected to be sufficiently thick to permit the surface roughness of the release layer to be substantially decoupled from the underlying carrier substrate surface roughness. This decoupling may permit the release layer to have a mean peak to valley roughness that is less than a mean peak to valley roughness of the underlying substrate. In some embodiments, the release layer thickness may be less than or equal to about 20 times, less than or equal to about 15 times, less than or equal to about 10 times, less than or equal to about 5 times, less than or equal to about 4 times, less than or equal to about 3 times, or less than or equal to about 2 times the $R_z$ of the carrier substrate. Correspondingly, the release layer thickness may be greater than or equal to about 1 times, greater than or equal to about 2 times, greater than or equal to about 3 times, greater than or equal to about 4 times, greater than or equal to about 5 times, or greater than or equal to about 10 times the $R_z$ of the carrier substrate. Combinations of the above ranges are possible (e.g. a release layer thickness greater than or equal to about 2 times the $R_z$ of the carrier substrate and less than or equal to about 10 times the $R_z$ of the carrier substrate). Other ranges are also possible.

FIGS. 3-5 depict a lamination process of two separate electrode structures to form a single combined electrode structure. Such an embodiment is advantageous in that it creates two electroactive surfaces arranged on opposite sides of the electrode structure for participating in the electrochemical reaction of an electrochemical cell as occurs in plate and jellyroll arrangements. In the depicted embodiment, a first portion 12 and a second portion 14 include electroactive material layers 8 disposed on protective layers 6 disposed on release layers 4 disposed on carrier substrates 2. The first and second portions 12 and 14 are oriented such that the two electroactive material layers are adjacent to one another. As depicted in FIG. 4, a pressure 16 is then applied to the first and second portions. In some embodiments, the pressure is sufficient to cause deformation of the lithium surfaces and adhesion between the first and second portions. After the two portions have been laminated, carrier substrates 2 may be delaminated or otherwise removed from the resulting combined electrode structure to form the final electrode structure depicted in FIG. 5. As depicted in FIGS. 6-8, in some embodiments, at least one of the first and second portions 12 and 14 includes a current collector 10. The combined electrode structure is then subject to the same lamination process to form an electrode structure with a current collector embedded in the center of the combined electrode structure. As described herein, other intervening layers may be also be present between the layers shown in FIGS. 3-5 in certain embodiments.

In some embodiments a pressure is applied during lamination of two electrode portions, when the electrode portion is in the final electrochemical cell, and/or during use of the cell. The pressure may be an externally-applied (e.g., in some embodiments, uniaxial) pressure. The externally-applied pressure may, in some embodiments, be chosen to be similar to or greater than the yield stress of a material forming the electroactive material layer. For example, lithium has a yield strength of about 5 kg/cm$^2$. Therefore, in certain embodiments in which the electroactive material layer comprises lithium, the applied pressures may be greater than or equal to about 5 kg/cm$^2$. In some embodiments, the applied pressure may be greater than or equal to about 2.5 kg/cm$^2$, greater than or equal to about 5 kg/cm$^2$, greater than or equal to about 6 kg/cm$^2$, greater than or equal to about 7 kg/cm$^2$, greater than or equal to about 8 kg/cm$^2$, greater than or equal to about 9 kg/cm$^2$, or any other appropriate pressure. Correspondingly, the applied pressure may be less than or equal to about 20 kg/cm$^2$, less than or equal to about 10 kg/cm$^2$, less than or equal to about 9 kg/cm$^2$, less than or equal to about 8 kg/cm$^2$, less than or equal to about 7 kg/cm$^2$, less than or equal to about 6 kg/cm$^2$, or any other appropriate pressure. Combinations of the above are possible (e.g. an applied pressure of greater than or equal to about 5 kg/cm$^2$ and less than or equal to about 10 kg/cm$^2$). Other ranges are also possible. In embodiments in which a release layer is used, the release layer may be designed to withstand such applied pressures.

For instance, in some embodiments, the yield strength of the release layer (which may be in the form of, for example, a polymer film or a polymer gel) may be greater than or equal to about 2.5 kg/cm$^2$, greater than or equal to about 5 kg/cm$^2$, greater than or equal to about 6 kg/cm$^2$, greater than or equal to about 7 kg/cm$^2$, greater than or equal to about 8 kg/cm$^2$, greater than or equal to about 9 kg/cm$^2$, or any other appropriate pressure. Correspondingly, the yield strength may be less than or equal to about 50 kg/cm$^2$, less than or equal to about 20 kg/cm$^2$, less than or equal to about 10 kg/cm$^2$, less than or equal to about 9 kg/cm$^2$, less than or equal to about 8 kg/cm$^2$, less than or equal to about 7 kg/cm$^2$, less than or equal to about 6 kg/cm$^2$, or any other appropriate pressure. Combinations of the above are possible (e.g. an applied pressure of greater than or equal to about 5 kg/cm$^2$ and less than or equal to about 50 kg/cm$^2$). Other ranges are also possible. In some embodiments, the release layer includes a yield strength in one or more of the above-noted ranges when it is incorporated in an electrochemical cell. In such embodiments, the release layer may be, for example, in a swollen state or a non-swollen state in the electrochemical cell.

The release layer may also be designed such that its yield strength is greater than a particular value. In certain embodiments, the yield strength of the release layer is at least about 0.8 times the yield strength of the electroactive material used with the release layer, and in some embodiments, greater than the pressure applied to the article (e.g., the normal component of an applied anisotropic force). In some embodiments, the yield strength of the release layer is greater than or equal to about 1 times, greater than or equal to about 1.2 times, greater than or equal to about 1.5 times, greater than or equal to about 2 times, greater than or equal to about 3 times, greater than or equal to about 4 times, greater than or equal to about 5 times the yield strength of the electroactive material. Correspondingly, the yield strength of the release layer may be less than or equal to about 10 times, less than or equal to about 8 times, less than or equal to about 6 times, less than or equal to about 4 times, or less than or equal to about 2 times the yield strength of the electroactive material. Combinations of the above-noted ranges are also possible (e.g., a yield strength of greater than or equal to about 1.2 times and less than or equal to about 10 times the yield strength of the electroactive material). Other ranges are also possible.

In some embodiments, the yield strength of the release layer is greater than or equal to about 1 times, greater than or equal to about 1.2 times, greater than or equal to about 1.5 times, greater than or equal to about 2 times, greater than or equal to about 3 times, greater than or equal to about 4 times, greater than or equal to about 5 times the normal component of the pressure that is applied to the article (e.g., during fabrication and/or use). Correspondingly, the yield strength of the release layer may be less than or equal to about 10 times, less than or equal to about 8 times, less than or equal to about 6 times, less than or equal to about 4 times, or less than or equal to about 2 times the normal component of the pressure that is applied to the article (e.g., during fabrication and/or use). Combinations of the above-noted ranges are also possible (e.g., a yield strength of greater than or equal to about 1.2 times and less than or equal to about 10 times the normal component of the pressure that is applied to the article). Other ranges are also possible.

In some embodiments, the applied pressure may be combined with elevated temperatures to further facilitate bonding of the two electroactive material layers to one another. To prevent possible damage to the electrode during the lamination process, the temperature should be selected such that it is does not damage any of the components within the electrode structure during the lamination process. In one embodiment, the temperature may be greater than or equal to about 50° C., greater than or equal to about 60° C., greater than or equal to about 70° C., greater than or equal to about 80° C., greater than or equal to about 90° C., greater than or equal to about 100° C., greater than or equal to about 110° C., greater than or equal to about 120° C., greater than or equal to about 130° C., or any other appropriate temperature. Correspondingly, the temperature may be less than or equal to about 150° C., less than or equal to about 140° C., less than or equal to about 130° C., less than or equal to about 120° C., less than or equal to about 110° C., less than or equal to about 100° C., less than or equal to about 90° C., less than or equal to about 80° C., less than or equal to about 70° C., or any other appropriate temperature. Combinations of the above are possible (e.g., greater than or equal to about 70° C. and less than or equal to about 130° C.). Other ranges are also possible.

Figure 9:
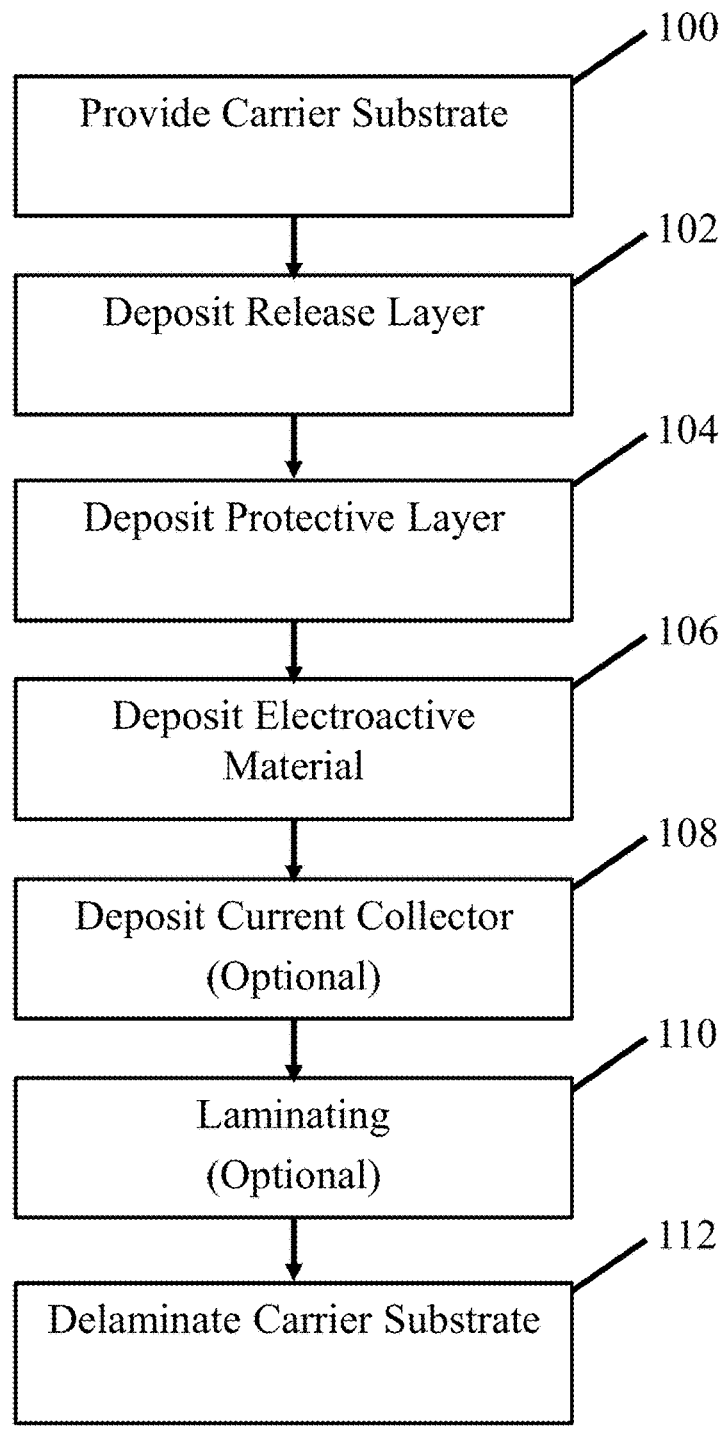
FIG. 9 is a representative flow diagram of a method for manufacturing an electrode structure, according to one set of embodiments.

A representative flow diagram of one embodiment for producing an electrode structure is presented in FIG. 9. A carrier substrate is provided at 100. Subsequently, a release layer is deposited onto a surface of the carrier substrate at 102 using any of the above noted materials and deposition methods. The protective layer is then deposited onto a surface of the release layer having a relatively low mean peak to valley roughness at 104. As described previously, the deposition of the protective layer onto the surface of the release layer results in a substantially continuous protective layer with a surface exhibiting a roughness value that may be substantially similar to the roughness of the underlying release layer surface. Optionally, one or more additional protective layers may be deposited on the substantially continuous protective layer (not shown). After formation of the protective layer, an electroactive material layer is deposited onto the protective layer at 106. Depending upon the embodiment, an optional current collector is deposited onto the electroactive material layer at 108. Further, in embodiments where two opposing electroactive surfaces are desired, such as for plate and jellyroll electrochemical cell configurations, the resulting electrode structure may be laminated with another electrode structure to form a combined electrode structure with two opposing electroactive surfaces at 110. After forming the desired electrode structure, the carrier substrate may be delaminated at 112. Depending upon the embodiment, the release layer may, or may not, be delaminated with the carrier substrate, or otherwise removed from the electrode structure (e.g., from the surface of the protective layer). For instance, in some embodiments, at least a portion of the release layer may remain on a carrier substrate after removal of the carrier substrate from an electrode structure. In other embodiments, however, the release layer (or at least a portion thereof) may remain a part of the electrode structure after removal of the electrode structure from a carrier substrate. While specific material layers and arrangements are described above, it should be understood, that other possible steps such as the deposition of other material layers between the above noted layers are also possible.

Different methods of removing a release layer from a carrier substrate or an electrode structure (e.g., from a surface of a protective layer) are possible. As described herein, in some embodiments, the release layer may be delaminated from a carrier substrate or an electrode structure (e.g., from a surface of a protective layer). For instance, an electrode structure and/or a release layer may be releasable (e.g., delaminated) from a carrier substrate or an electrode structure (e.g., from a surface of a protective layer) with a peel force of at least 0.005 lbs, at least 0.01 lbs, at least 0.015 lbs, at least 0.019 lbs, at least 0.020 lbs, at least 0.025 lbs, at least 0.025 lbs, at least 0.030 lbs, at least 0.035 lbs, at least 0.040 lbs, at least 0.045 lbs, or at least 0.050 lbs. Correspondingly, the electrode structure and/or a release layer may be releasable from a carrier substrate or an electrode structure (e.g., from a surface of a protective layer) with a peel force of less than or equal to 0.10 lbs, less than or equal to 0.090 lbs, less than or equal to 0.080 lbs, less than or equal to 0.070 lbs, less than or equal to 0.060 lbs, less than or equal to 0.050 lbs, less than or equal to 0.040 lbs, less than or equal to 0.030 lbs, less than or equal to 0.020 lbs, or less than or equal to 0.010 lbs. Combinations of the above-referenced ranges are also possible (e.g., a peel force of at least 0.015 lbs and less than or equal to 0.050 lbs). The peel force can be measured using a Mark-10, Series BG, Motorized Test Stand ESM301. In certain embodiments, the release layer is designed to be released from a carrier substrate with a peel force in one or more of the above-referenced ranges so as to avoid or minimize damage to the underlying electrode structure (such as an underlying protective layer).

In other embodiments, all or portions of the release layer may be dissolved in a solvent to facilitate its removal from an electrode structure and/or a carrier substrate. In one particular embodiment, the release layer is formed of a material that can be dissolved in an electrolyte solvent to be used with the electrode structure. In some such embodiments, the release layer may be incorporated into an electrochemical cell, and the release layer can be subsequently removed by contacting the release layer with an electrolyte to be used with the cell.

For example, in one particular embodiment, a method may involve providing an electrochemical cell or cell precursor comprising an electrode structure described herein. The electrode structure may comprise, for example, at least a first release layer comprising a polymer, at least a first protective layer disposed on the first release layer, and a first electroactive material layer disposed on the first protective layer. The electrochemical cell or cell precursor may further include an electrolyte (e.g., a liquid electrolyte). The method may involve dissolving at least a portion of the polymer in the electrolyte so as to remove at least a portion of the release layer from the first protective layer. The polymer used to form the release layer may be chosen so as to not interfere with the operation of the electrochemical cell.

In other embodiments, a solvent may be used to aid release of a release layer (and accompanying electrode structure) from a carrier substrate so as to avoid or minimize the use of a force that could otherwise damage the underlying electrode structure. For instance, all or portions of a release layer (optionally with accompanying electrode structure which may include a protective layer and/or an electroactive layer) may be exposed to a solvent that weakens the adhesion between a surface of the release layer and a surface of the carrier substrate. Optionally, a small force may be applied to facilitate removal of the release layer from the carrier substrate. In some embodiments, a solvent that does not adversely react with or compromise the electroactive layer is used (e.g., in instances in which the electroactive layer is also exposed to the solvent). In some embodiments in which the electroactive layer is not exposed to the solvent, a wider range of solvents may be used. Other methods of removing or releasing a release layer are also possible.

In certain embodiments, the one or more carrier substrates may be left intact with the electrode structure after fabrication of the electrode, but may be delaminated before the electrode is incorporated into an electrochemical cell. For instance, the electrode structure may be packaged and shipped to a manufacturer who may then incorporate the electrode into an electrochemical cell. In such embodiments, the electrode structure may be inserted into an air and/or moisture-tight package to prevent or inhibit deterioration and/or contamination of one or more components of the electrode structure. Allowing the one or more carrier substrates to remain attached to the electrode can facilitate handling and transportation of the electrode. For instance, the carrier substrate(s) may be relatively thick and have a relatively high rigidity or stiffness, which can prevent or inhibit the electrode from distorting during handling. In such embodiments, the carrier substrate(s) can be removed by the manufacturer before, during, or after assembly of an electrochemical cell.

Suitable cathode active materials for use in the cathode of the electrochemical cells described herein include, but are not limited to, electroactive transition metal chalcogenides, metal oxides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes.

"Electroactive sulfur-containing materials," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments involving Li/S systems, the sulfur-containing material, in its oxidized form, comprises a polysulfide moiety, Sm, selected from the group consisting of covalent —Sm— moieties, ionic —Sm— moieties, and ionic $Sm_2$— moieties, wherein m is an integer equal to or greater than 3. In one embodiment, m of the polysulfide moiety, Sm, of the sulfur-containing polymer is an integer equal to or greater than 6. In another embodiment, m of the polysulfide moiety, Sm, of the sulfur-containing polymer is an integer equal to or greater than 8. In another embodiment, the sulfur-containing material is a sulfur-containing polymer. In another embodiment, the sulfur-containing polymer has a polymer backbone chain and the polysulfide moiety, Sm, is covalently bonded by one or both of its terminal sulfur atoms as a side group to the polymer backbone chain. In yet another embodiment, the sulfur-containing polymer has a polymer backbone chain and the polysulfide moiety, Sm, is incorporated into the polymer backbone chain by covalent bonding of the terminal sulfur atoms of the polysulfide moiety.

In one embodiment, the electroactive sulfur-containing material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The nature of the electroactive sulfur-containing materials useful in the practice of this invention may vary widely, as known in the art. In one embodiment, the electroactive sulfur-containing material comprises elemental sulfur. In another embodiment, the electroactive sulfur-containing material comprises a mixture of elemental sulfur and a sulfur-containing polymer.

In other embodiments, an electrochemical cell described herein includes a composite cathode. The composite cathode may include, for example, (a) an electroactive sulfur-containing cathode material, wherein said electroactive sulfur-containing cathode material, in its oxidized state, comprises a polysulfide moiety of the formula —Sm—, wherein m is an integer equal to or greater than 3, as described herein; and, (b) an electroactive transition metal chalcogenide composition. The electroactive transition metal chalcogenide composition may encapsulate the electroactive sulfur-containing cathode material. In some cases, it may retard the transport of anionic reduction products of the electroactive sulfur-containing cathode material. The electroactive transition metal chalcogenide composition may comprising an electroactive transition metal chalcogenide having the formula: $M_jY_k(OR)_l$, wherein M is a transition metal; Y is the same or different at each occurrence and is oxygen, sulfur, or selenium; R is an organic group and is the same or different at each occurrence; j is an integer ranging from 1 to 12; k is a number ranging from 0 to 72; and l is a number ranging from 0 to 72. In some embodiments, k and l cannot both be 0.

In order to retard out-diffusion of anionic reduction products from the cathode compartment in the cell, a sulfur-containing cathode material may be effectively separated from the electrolyte or other layers or parts of the cell by a layer of an electroactive transition metal chalcogenide composition. This layer can be dense or porous.

In one embodiment, a cathode includes a mixture of an electroactive sulfur-containing cathode material, an electroactive transition metal chalcogenide, and optionally binders, electrolytes, and conductive additives, which is deposited onto a current collector. In another embodiment, a coating of the electroactive sulfur-containing cathode material is encapsulated or impregnated by a thin coherent film coating of the cation transporting, anionic reduction product transport-retarding, transition metal chalcogenide composition. In yet another embodiment, a cathode includes particulate electroactive sulfur-containing cathode materials individually coated with an encapsulating layer of the cation transporting, anionic reduction product transport-retarding, transition metal chalcogenide composition. Other configurations are also possible.

In one embodiment, a composite cathode includes particulate sulfur-containing cathode materials, generally less than 10 microns in diameter, individually coated with an encapsulating layer of an alkali-metal cation-transporting, yet anionic reduction product transport-retarding electroactive transition metal chalcogenide composition. The particle may have a "core-shell" configuration, e.g., a core of an electroactive sulfur-containing cathode material and an outer shell of a retarding barrier layer comprising an electroactive transition metal chalcogenide. Optionally, the composite cathode may contain fillers comprising various types of binders, electrolytes and conductive materials such as those described herein.

In certain embodiments, the composite cathode is a particulate, porous electroactive transition metal chalcogenide composition, optionally containing non-electroactive metal oxides, such as silica, alumina, and silicates, that is further impregnated with a soluble electroactive sulfur-containing cathode material. This may be beneficial in increasing the energy density and capacity compared with cathodes including electroactive sulfur-containing cathode material (e.g., electroactive organo-sulfur and carbon-sulfur cathode materials) only.

In one set of embodiments, a composite cathode comprises an electroactive sulfur-containing material (e.g., a carbon-sulfur polymer or elemental sulfur); $V_2O_5$; conductive carbon; and a PEO binder.

Additional arrangements, components, and advantages of composite cathodes are described in more detail in U.S. Pub. No. 2006/0115579, filed Jan. 13, 2006, entitled "Novel composite cathodes, electrochemical cells comprising novel composite cathodes, and processes for fabricating same", which is incorporated herein by reference in its entirety.

Cathodes may further comprise one or more conductive fillers to provide enhanced electronic conductivity. Conductive fillers can increase the electrically conductive properties of a material and may include, for example, conductive carbons such as carbon black (e.g., Vulcan XC72R carbon black, Printex XE2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, metal mesh. In some embodiments, a conductive filler may include a conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Other conductive materials known to those of ordinary skill in the art can also be used as conductive fillers. The amount of conductive filler, if present, may be present in the range of 2 to 30% by weight of the cathode active layer. The cathodes may also further comprise other additives including, but not limited to, metal oxides, aluminas, silicas, and transition metal chalcogenides.

Cathodes may also comprise a binder. The choice of binder material may vary widely so long as it is inert with respect to the other materials in the cathode. In some embodiments, the binder material may be a polymeric material. Examples of polymer binder materials include, but are not limited to, polyvinylidene fluoride (PVDF)-based polymers, such as poly(vinylidene fluoride) (PVDF), $PVF_2$ and its co- and terpolymers with hexafluoroethylene, tetrafluoroethylene, chlorotrifluoroethylene, poly(vinyl fluoride), polytetrafluoroethylenes (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene-propylene-diene (EPDM) rubbers, ethylene propylene diene terpolymers, styrene-butadiene rubbers (SBR), polyimides or ethylene-vinyl acetate copolymers. In some cases, the binder material may be substantially soluble in aqueous fluid carriers and may include, but is not limited to, cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) and polyethylene oxides (PEO). In one set of embodiments, the binder material is poly(ethylene-co-propylene-co-5-methylene-2-norbornene) (EPMN), which may be chemically neutral (e.g., inert) towards cell components, including polysulfides. UV curable acrylates, UV curable methacrylates, and heat curable divinyl ethers can also be used. The amount of binder, if present, may be present in the range of 2 to 30% by weight of the cathode active layer.

Other suitable cathode materials are also possible. For instance, cathodes for alkali metal ion batteries (e.g., lithium ion batteries) are also possible.

As noted above, the assembled electrochemical cells include electrolyte in addition to the electrodes and other components present within the cell. The electrolytes used in electrochemical cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions between the anode and the cathode may be used. The electrolyte may be electronically non-conductive to prevent short circuiting between the anode and the cathode. In one set of embodiments a non-aqueous-based electrolyte is used; in another set of embodiments, an aqueous-based electrolyte is used.

In some embodiments, an electrolyte may be present as a polymer layer such as a gel or solid polymer layer. In some cases, in addition to being able to function as a medium for the storage and transport of ions, a polymer layer positioned between an anode and cathode can function to screen the anode (e.g., a base electrode layer of the anode) from any cathode roughness under an applied force or pressure, keeping the anode surface smooth under force or pressure, and stabilizing any multi-layered structures of the anode (e.g., ceramic polymer multi-layer) by keeping the multi-layer pressed between the base electrode layer and the smooth polymer layer. In some such embodiments, the polymer layer may be chosen to be compliant and have a smooth surface.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994).

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

In some embodiments, specific liquid electrolyte solvents that may be favorable towards the anode (e.g., have relatively low reactivity towards lithium, good lithium ion conductivity, and/or relatively low polysulfide solubility) include, but are not limited to 1,1-dimethoxyethane (1,1-DME), 1,1-diethoxyethane, 1,2-diethoxyethane, diethoxymethane, dibutyl ether, anisole or methoxybenzene, veratrole or 1,2-dimethoxybenzene, 1,3-dimethoxybenzene, t-butoxyethoxyethane, 2,5-dimethoxytetrahydrofurane, cyclopentanone ethylene ketal, and combinations thereof. Specific liquid electrolyte solvents that may be favorable towards the cathode (e.g., have relatively high polysulfide solubility, and/or can enable high rate capability and/or high sulfur utilization) include, but are not limited to dimethoxyethane (DME, 1,2-dimethoxyethane) or glyme, diglyme, triglyme, tetraglyme, polyglymes, sulfolane, 1,3-dioxolane (DOL), tetrahydrofuran (THF), acetonitrile, and combinations thereof.

Specific mixtures of solvents include, but are not limited to 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may vary from about 5 to 95 to 95 to 5. In some embodiments, a solvent mixture comprises dioxolanes (e.g., greater than 40% by weight of dioxolanes).

In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes may further comprise one or more ionic electrolyte salts, also as known in the art, to increase the ionic conductivity. Examples of ionic electrolyte salts for use in the electrolytes described herein include, but are not limited to, LiSCN, LiBr, LiI, LiClO4, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li2S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary. Furthermore, if an ionic N—O additive such as an inorganic nitrate, organic nitrate, or inorganic nitrite is used, it may provide ionic conductivity to the electrolyte in which case no additional ionic lithium electrolyte salts may be needed.

As noted previously a heterogeneous electrolyte may be used in an electrochemical cell including the currently disclosed electrode structures. As used herein, a "heterogeneous electrolyte" is an electrolyte including at least two different liquid solvents (referred to herein as first and second electrolyte solvents, or anode-side and cathode-side electrolyte solvents). The two different liquid solvents may be miscible or immiscible with one another, although in many aspects, many electrolyte systems include one or more solvents that are immiscible (or can be made immiscible within the cell) to the extent that they will largely separate and at least one can be isolated from at least one component of the cell. A heterogeneous electrolyte may be in the form of a liquid, a gel, or a combination thereof. Specific examples of heterogeneous electrolytes are provided below.

As certain embodiments described herein involve a heterogeneous electrolyte having at least two electrolyte solvents that can partition during operation of the electrochemical cell, one goal may be to prevent or decrease the likelihood of spontaneous solvent mixing, i.e., generation of an emulsion of two immiscible liquids. This may be achieved in some embodiments by "immobilizing" at least one electrolyte solvent at an electrode (e.g., an anode) by forming, for example, a polymer gel electrolyte, glassy-state polymer, or a higher viscosity liquid that resides disproportionately at that electrode.

In one embodiment, suitable electrolytes for the heterogeneous electrolyte include a first electrolyte solvent (e.g., dioxolane (DOL)) that partitions towards the anode and is favorable towards the anode (referred to herein as an "anode-side electrolyte solvent") and a second electrolyte solvent (e.g., 1,2-dimethoxyethane (DME)) that partitions towards the cathode and is favorable towards the cathode (and referred to herein as an "cathode-side electrolyte solvent"). In some embodiments, the anode-side electrolyte solvent has a relatively lower reactivity towards lithium metal and may be less soluble to polysulfides (e.g., $Li_2S_x$, where x>2) than the cathode-side electrolyte solvent. The cathode-side electrolyte solvent may have a relatively higher solubility towards polysulfides, but may be more reactive towards lithium metal. By separating the electrolyte solvents during operation of the electrochemical cell such that the anode-side electrolyte solvent is present disproportionately at the anode and the cathode-side electrolyte solvent is present disproportionately at the cathode, the electrochemical cell can benefit from desirable characteristics of both electrolyte solvents (e.g., relatively low lithium reactivity of the anode-side electrolyte solvent and relatively high polysulfide solubility of the cathode-side electrolyte solvent). Specifically, anode consumption can be decreased, buildup of insoluble polysulfides (i.e., "slate", lower-order polysulfides such as $Li_2S_x$, where x<3, e.g., $Li_2S_2$ and $Li_2S$) at the cathode can be decreased, and as a result, the electrochemical cell may have a longer cycle life. Furthermore, the batteries described herein may have a high specific energy (e.g., greater than 400 Wh/kg), improved safety, and/or may be operable at a wide range of temperatures (e.g., from −70° C. to +75° C.). Disproportionate presence of one species or solvent, verses another, at a particular location in a cell means that the first species or solvent is present, at that location (e.g., at a surface of a cell electrode) in at least a 2:1 molar or weight ratio, or even a 5:1, 10:1, 50:1, or 100:1 or greater ratio.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. patent application Ser. Nos. 08/995,089 and 09/215,112 by Carlson et al. of the common assignee. Solid electrolytes and gel electrolytes may also function as a separator in addition to their electrolyte function.

In some embodiments, the application of a force normal to the electroactive surfaces within the electrochemical cell may reduce and/or prevent depletion of active materials due to undesired side reactions such as mossy lithium growth, dendritic formation, and other applicable side reactions. Correspondingly, the application of a normal force to the electroactive surface may reduce and/or eliminate the need for the inclusion of large amounts of anode active material and/or electrolyte within the electrochemical cell. By reducing and/or eliminating the need to accommodate for active material loss during charge-discharge of the cell, smaller amounts of anode active material may be used to fabricate cells and devices. The force may be applied to the exterior of a cell or to the internal components of a cell using any number of different configurations including, for example, the embodiments described below.

In one embodiment, a constricting element may surround at least a portion of a cell or a stack of cells. In some embodiments, the constricting element may comprise a band (e.g., a rubber band, a turnbuckle band, etc.). In one specific embodiment, a band can be affixed to the cell or stack of cells by, for example adhesive, staples, clamps, a turnbuckle, or any other suitable method. In other embodiments, compressive plates or other structures could be used. While several possible embodiments have been described regarding possible constricting elements to provide a normal force to the electroactive surfaces within the electrochemical cell, it should be understood that any number of different configurations could be used in the current disclosure is not limited to the specific constricting elements described herein.

The use of constriction elements is not limited to flat cell geometries. In some instances, a constriction element may be used to apply a force to a cylindrical electrochemical cell or a prismatic electrochemical cell (e.g., a triangular prism, a rectangular prism, etc.).

Any of the constriction elements described above may be used as constriction elements in cylindrical cells, prismatic cells, or other such cells. For example, in some embodiments, one or more wraps of the same or different winding material may be positioned on the outside surface of the cell. In some embodiments, the winding material comprises a relatively high strength. The winding material may also comprise a relatively high elastic modulus. In some cases, shrink wrap tubing such as polyester film and fabric. In some cases, the constriction element comprises an elastic material properly sized to provide required external pressure after it relaxes on the outer surface of the cell.

In some embodiments, the cell may comprise an expanding element (e.g., an expanding mandrel) within an inner volume of the cell. The expanding element can be constructed and arranged to apply a force radiating outward from the inner volume of the electrochemical cell. In some embodiments, the expanding element and the constricting element can be constructed and arranged such that the force (e.g., pressure) at each point within the boundaries of the electrochemical cell deviates by less than about 30%, less than about 20%, less than about 10%, or less than about 5% of the average force (e.g., pressure) within the boundaries electrochemical cell. In some embodiments, such a distribution of forces can be achieved, for example, by selecting constricting and expanding elements such that substantially equal internal and external forces per unit area are applied to the cell.

In some embodiments, rather than applying an internal force to define a pressure, external force application can be combined with complimentary winding mechanics to achieve a radial pressure distribution that is within acceptable bounds. In some embodiments, the total volumes of the pressure distribution elements(s) (e.g., end caps, spacers, etc.) and the element(s) used to apply a force to the cell or stack of cells (e.g., bands, mandrels, etc.) may be relatively low. By employing low volumes, the energy density of the assembly may be kept relatively high. In some cases, the sum of the volumes of the pressure distribution element(s) and the element(s) used to apply a force to a cell or stack of cells comprises less than about 10%, less than about 5%, less than about 2%, less than about 1%, less than about 0.5%, less than about 0.1%, between about 0.1% and about 10%, between about 0.1% and about 5%, between about 0.1% and about 2%, or between about 0.1% and about 1% of the volume of the cell or stack of cells.

In some embodiments, an anisotropic force with a component normal to an active surface of the anode is applied to an electrochemical cell described herein, during at least one period of time during charge and/or discharge of the cell, to an extent effective to inhibit an increase in surface area of the anode active surface relative to an increase in surface area absent the anisotropic force. The electrochemical cell may include an electrode structure or a portion of an electrode structure described herein. The component of the anisotropic force normal to the anode active surface may, for example, define a pressure of at least about 4.9, at least about 9.8, at least about 24.5, at least about 49, at least about 78, at least about 98, at least about 117.6, at least about 147, at least about 175, at least about 200, at least about 225, or at least about 250 Newtons per square centimeter. In some embodiments, the component of the anisotropic force normal to the anode active surface may, for example, define a pressure of less than about 250, less than about 225, less than about 196, less than about 147, less than about 117.6, less than about 98, less than about 49, less than about 24.5, or less than about 9.8 Newtons per square centimeter. Combinations of the above-referenced ranges are also possible. The force or pressure may, in some embodiments, be externally-applied to the cell, as described herein. While forces and pressures are generally described herein in units of Newtons and Newtons per unit area, respectively, forces and pressures can also be expressed in units of kilograms-force ($kg_f$) and kilograms-force per unit area, respectively. One or ordinary skill in the art will be familiar with kilogram-force-based units, and will understand that 1 kilogram-force is equivalent to about 9.8 Newtons.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No. PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No. PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No. PCT/US2008/010894, filed Sep. 19, 2008, published as International Pub. No. WO/2009042071, and entitled "Electrolyte Additives for Lithium Batteries and Related Methods"; International Patent Apl. Serial No. PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12,471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. Provisional Patent Apl. Ser. No. 61/376,554, filed on Aug. 24, 2010, entitled "Electrically Non-Conductive Materials for Electrochemical Cells;" U.S. patent application Ser. No. 12/862,528, filed on Aug. 24, 2010, published as U.S. Pub. No. 2011/0177398, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur" [S1583.70029US00]; U.S. patent application Ser. No. 12/862,551, filed on Aug. 24, 2010, published as U.S. Pub. No. 2011/0070491, entitled "Electrochemical Cells Comprising Porous Structures Comprising Sulfur" [S1583.70030US00]; U.S. patent application Ser. No. 12/862,576, filed on Aug. 24, 2010, published as U.S. Pub. No. 2011/0059361, entitled "Electrochemical Cells Comprising Porous Structures Comprising Sulfur" [S1583.70031US00]; U.S. patent application Ser. No. 12/862,581, filed on Aug. 24, 2010, published as U.S. Pub. No. 2011/0076560, entitled "Electrochemical Cells Comprising Porous Structures Comprising Sulfur" [S1583.70024US01]; U.S. patent application Ser. No. 13/240,113, filed on Sep. 22, 2011, published as U.S. Pub. No. 2012/0070746, entitled "Low Electrolyte Electrochemical Cells" [S1583.70033US01]; U.S. patent application Ser. No. 13/033,419, filed Feb. 23, 2011, published as U.S. Pub. No. 2011/0206992, entitled "Porous Structures for Energy Storage Devices" [S1583.70034US00]; U.S. patent application Ser. No. 13/524,662, filed Jun. 15, 2012, published as U.S. Pub. No. 2013/0017441, entitled "Plating Technique for Electrode" [S1583.70040US01]; U.S. patent application Ser. No. 13/766,862, filed Feb. 14, 2013, entitled "Electrode Structure for Electrochemical Cell" [S1583.70041US01]; U.S. patent application Ser. No. 13/644,933, filed Oct. 4, 2012, entitled "Electrode Structure and Method for Making the Same" [S1583.70044US01]; U.S. patent application Ser. No. 14/069,698, filed Nov. 1, 2013, entitled "Electrode Active Surface Pretreatment" [S1583.70047US01]; and U.S. patent application Ser. No. 13/833,377, filed Mar. 15, 2013, entitled "Protective Structures for Electrodes" [S1583.70051US00]. All other patents and patent applications disclosed herein are also incorporated by reference in their entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

EXAMPLES

Example 1

Figure 10A:
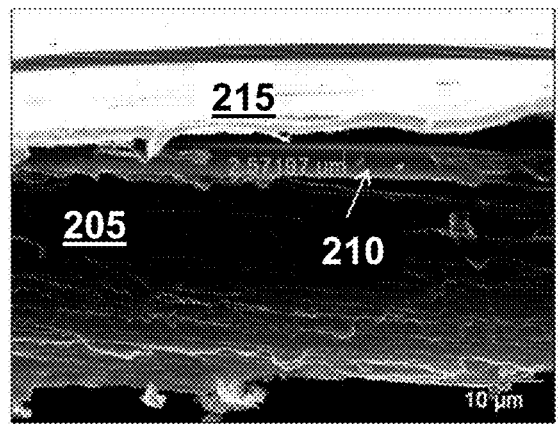
FIG. 10A shows a cross-sectional view of an electrode structure including a polymer layer, a lithium oxide layer, and a lithium metal layer, according to one set of embodiments.
Figure 10B:
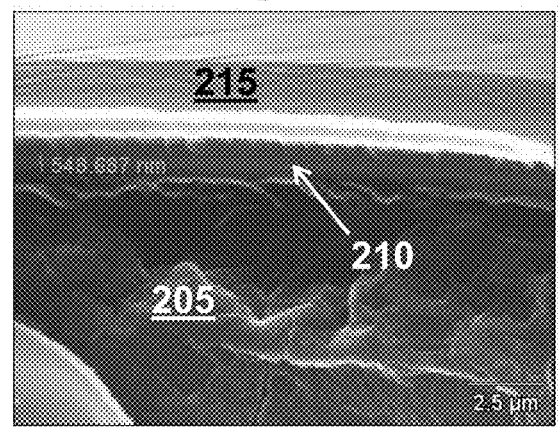
FIG. 10B shows a cross-sectional view of an electrode structure including a polymer layer, a lithium oxide layer, and a lithium metal layer, according to one set of embodiments.

An optical grade polyethylene terephthalate (PET) carrier substrate was coated with a 6 wt % solution of polysulfone polymer in diglyme. The coating was dried at 40° C. and produced a 2 micron thick polysulfone polymer layer. The polysulfone polymer layer had a mean peak to valley roughness ($R_z$) below 300 nm. After measuring the surface roughness, the surface of the polysulfone polymer layer was coated with protective layer of lithium oxide of a desired thickness. The lithium oxide coating was deposited using a chemical vapor deposition technique in vacuum using $CO_2$ gas and metallic lithium vapor. A 21 micron thick layer of metallic lithium was subsequently deposited in vacuum onto the surface of the lithium oxide protective layer. The PET carrier substrate was delaminated from the polysulfone polymer layer resulting in an electrode structure including a metallic lithium electroactive layer 205, a lithium oxide layer 210, and a polysulfone polymer layer 215 (FIGS. 10A and 10B). The two examples presented in FIGS. 10A and 10B had lithium oxide layers 210 with thickness of about 2.57 micrometers and 0.548 micrometers respectively. It should be understood that other thicknesses greater than or less than the above noted exemplary thicknesses also could have been provided.

The cross-sections of the electrode structures presented in FIGS. 10A and 10B were analyzed with SEM imaging to evaluate adhesion between the various layers. The SEM analysis confirmed that there was good adhesion between the metallic lithium layer and the lithium oxide protective layer in both electrode structures without any obvious defects in the imaged cross-sections.

An electrode structure was produced from electrodes similar to those imaged above. The electrode structures included a copper current collector that was provided by sputtering copper onto the surface of the metallic lithium layer prior to the delamination of the PET carrier substrate. The copper current collector had a thickness of 0.2 microns. The resulting electrode structure after delamination of the PET carrier substrate included a copper current collector, a metallic lithium electroactive layer, a lithium oxide layer, and a polysulfone polymer layer.

Electrode structures similar to those described above, with and without a copper current collector, were assembled into separate small pouch cells with a sulfur cathode and Celgard2325 separator. The cells were filled with liquid electrolyte, soaked for two days and discharged at a C/10 rate and charged at a C/8 rate. The assembled cells exhibited sulfur specific capacities between about 1050 mA/g and about 1160 mA/g.

Comparative Example 1

Figure 10C:
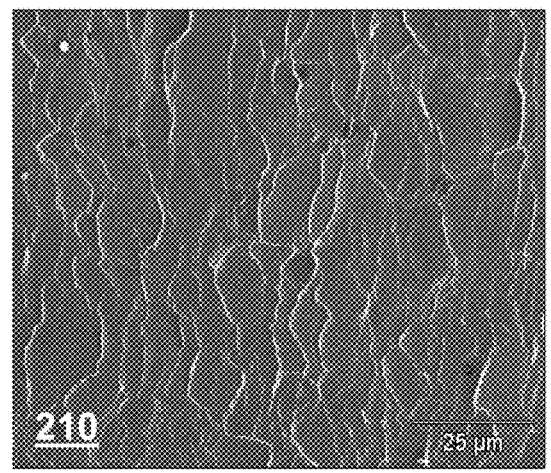
FIG. 10C shows a top view of a lithium oxide layer having numerous cracks and defects after being deposited directly onto a lithium metal substrate.

In a comparative example, a PET carrier substrate was metalized with a 0.2 micron thick layer of copper. Subsequently, a layer of metallic lithium was coated in vacuum onto the metallized copper surface under similar conditions as for the metallic lithium layer of Example 1. The metallic lithium layer thickness was about 20 microns and the Rz surface roughness was about 2000 nm. The metallic lithium surface was then coated with a 0.5 micron thickness lithium oxide layer. The resulting electrode structure was analyzed with SEM imaging to evaluate whether or not there was good adhesion between the metallic lithium and the deposited lithium oxide layer. As confirmed by the SEM analysis, the deposited lithium oxide layer 210 did not produce a continuous protective layer (and included numerous cracks and defects) due to the high surface roughness of the underlying lithium (FIG. 10C).

Comparative Example 2

Figure 11A:
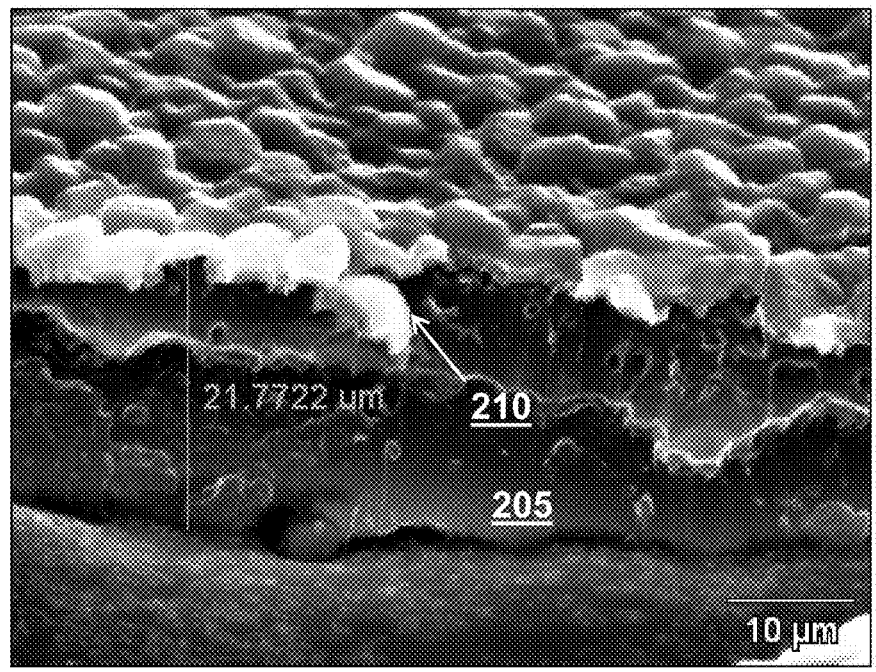
FIG. 11A shows a cross-sectional view of an electrode structure including a ceramic layer deposited on a lithium layer.

In another comparative example, a 2 um thick lithium oxide coating 210 was deposited onto an underlying 21.7 um thick base metallic lithium layer 205. The base metallic lithium layer 205 typically has a surface roughness of about $R_z$=2-3 um which is supported by the observed roughness shown in the cross-section depicted in FIG. 11A. The lithium oxide coating 210 appears to have a surface roughness that mimics the roughness of the underlying lithium metal 205. Further, as illustrated by the figure, given that the thickness of the lithium oxide coating 210 is less than the roughness of the underlying lithium metal 205, there is a high probability that the lithium oxide layer is not continuous. Further, and without wishing to be bound by theory, even if the lithium oxide layer was deposited in a conformal fashion over the rough lithium surface depicted in FIG. 11A, the deposited lithium oxide layer 210 would break upon the application of a pressure due to the deformation of the underlying soft lithium peaks, which would in turn shear the oxide coating.

Example 2

Figure 11B:
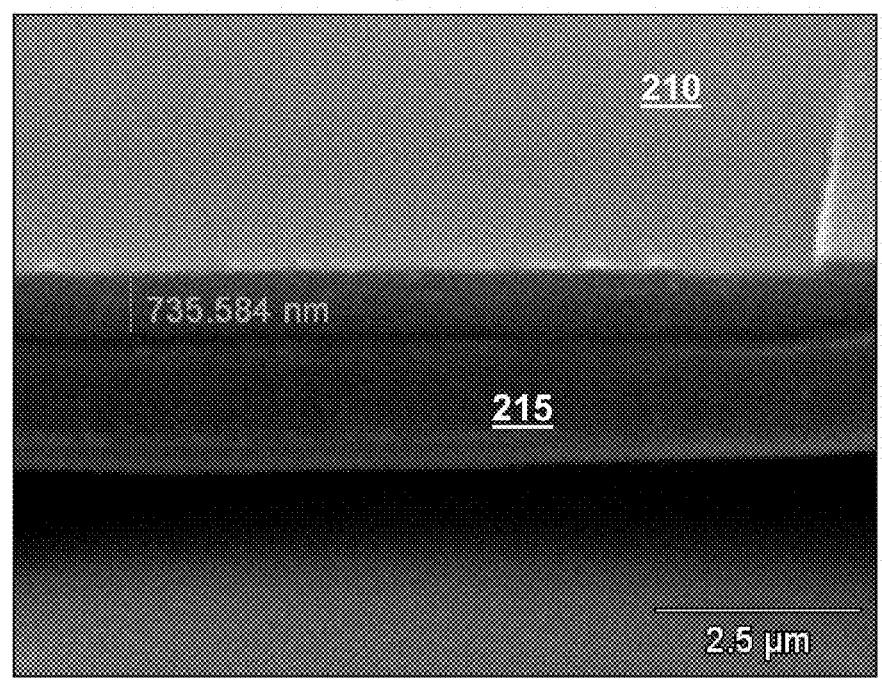
FIG. 11B shows a cross-sectional view of an electrode structure including a lithium oxide layer deposited on a polymer layer according to one set of embodiments.

In contrast to the above, as shown in FIG. 11B, a 735 nm lithium oxide layer 210 was vacuum deposited on a gel layer

215. Prior to deposition of the lithium oxide layer 210 the measured peak-to-valley roughness ($R_z$) of the gel layer was found to be 104 nm. The resulting $R_z$ on the exposed lithium oxide surface had a measured peak-to-valley value of 126 nm, which is on the same order as that measured for the gel surface and much less than that observed for lithium oxide layer deposited directly onto underlying lithium depicted in FIG. 11A. Additionally, the figure also clearly shows that a continuous lithium oxide layer has been deposited on top of the gel layer as the result of deposition of a targeted oxide thickness that is greater than the $R_z$ of the underlying gel layer 215.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An electrode structure comprising:
   a first release layer, wherein the first release layer is formed of a material that can be dissolved in an electrolyte solvent to be used with the electrode structure;
   a substantially continuous protective layer disposed on the first release layer, wherein a mean peak to valley roughness of the substantially continuous protective layer is between about 0.1 µm and about 1 µm, and wherein a thickness of the substantially continuous protective layer is between about 0.1 µm and about 2 µm; and
   a first electroactive material layer disposed on the substantially continuous protective layer, and wherein the thickness of the substantially continuous protective layer is at least two times greater than the mean peak to valley roughness of the substantially continuous protective layer.

2. The electrode structure of claim 1, wherein the first release layer is at least one of a polymer, a gel polymer, and a wax.

3. The electrode structure of claim 1, wherein the thickness of the substantially continuous protective layer is greater than the mean peak to valley roughness of the substantially continuous protective layer.

4. The electrode structure of claim 1, wherein the first release layer comprises a material that is substantially amorphous.

5. The electrode structure of claim 1, wherein an adhesive strength between the first release layer and the substantially continuous protective layer is greater than an adhesive strength between the first release layer and a first carrier substrate on which the first release layer is disposed.

6. The electrode structure of claim 5, further comprising a second carrier substrate disposed on a second release layer, wherein the second release layer is disposed on a second protective layer, and wherein the second protective layer is disposed on a second electroactive material layer.

7. The electrode structure of claim 6, wherein a current collector is disposed between the first electroactive material layer and the second electroactive material layer.

8. The electrode structure of claim 6, wherein an intermediate layer is disposed between at least one of the first carrier substrate and the first release layer, the first release layer and the substantially continuous protective layer, and the first protective layer and the first electroactive material layer.

9. The electrode structure of claim 1, wherein the first release layer is conductive to lithium ions.

10. The electrode structure of claim 1, wherein the first release layer comprises a lithium salt.

11. The electrode structure of claim 1, wherein the first electroactive material layer comprises lithium metal.

12. The electrode structure of claim 5, wherein a mean peak to valley roughness of an interface between the first release layer and the substantially continuous protective layer is less than a mean peak to valley roughness of the first carrier substrate.

13. The electrode structure of claim 1, wherein the first electroactive material layer comprises an alkali metal.

14. The electrode structure of claim 5, wherein the first electroactive material layer comprises lithium metal, wherein the first release layer is at least one of a polymer, a gel polymer, and a wax, wherein an adhesive strength between the first release layer and the substantially continuous protective layer is greater than an adhesive strength between the first release layer and the first carrier substrate, wherein the thickness of the substantially continuous protective layer is at least two times greater than the mean peak to valley roughness of the substantially continuous protective layer, and wherein a thickness of the first protective layer has a thickness of between about 0.1 µm and about 2 µm.

15. An electrode structure comprising:
   a first release layer, wherein the first release layer is formed of a material that can be dissolved in an electrolyte solvent to be used with the electrode structure;
   a first protective layer disposed on the first release layer; and
   a first electroactive material layer disposed on the first protective layer, wherein a mean peak to valley roughness of an interface between the first protective layer and the first electroactive material layer is between about 0.1 µm and about 1 µm, wherein a thickness of the first protective layer is between about 0.1 µm and about 2 µm, wherein the first protective layer is substantially continuous, and wherein the thickness of the substantially continuous protective layer is at least two times greater than the mean peak to valley roughness of the substantially continuous protective layer.

* * * * *